(12) United States Patent
Kuwano et al.

(10) Patent No.: US 9,154,053 B2
(45) Date of Patent: Oct. 6, 2015

(54) PIEZOELECTRIC ACTUATOR AND LENS BARREL

(71) Applicant: NIKON CORPORATION, Tokyo (JP)

(72) Inventors: Kunihiro Kuwano, Kawasaki (JP); Hiromoto Kanamitsu, Funabashi (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/141,044

(22) Filed: Dec. 26, 2013

(65) Prior Publication Data

US 2014/0104711 A1 Apr. 17, 2014

Related U.S. Application Data

(63) Continuation of application No. 13/201,058, filed as application No. PCT/JP2010/002376 on Mar. 31, 2010, now Pat. No. 8,693,116.

(30) Foreign Application Priority Data

Mar. 31, 2009 (JP) ................... 2009-084113
Mar. 31, 2009 (JP) ................... 2009-084114

(51) Int. Cl.
*G02B 7/02* (2006.01)
*H02N 2/00* (2006.01)
*G02B 7/08* (2006.01)
*H02N 2/10* (2006.01)
*H02N 2/14* (2006.01)
*G02B 7/04* (2006.01)

(52) U.S. Cl.
CPC .................. *H02N 2/001* (2013.01); *G02B 7/04* (2013.01); *G02B 7/08* (2013.01); *H02N 2/101* (2013.01); *H02N 2/14* (2013.01)

(58) Field of Classification Search
USPC .................. 359/694–704, 811–824
See application file for complete search history.

(56) References Cited

U.S. PATENT DOCUMENTS

| | | | |
|---|---|---|---|
| 5,831,370 A * | 11/1998 | Sugaya | 310/323.01 |
| 8,693,116 B2 * | 4/2014 | Kuwano et al. | 359/824 |
| 2003/0226976 A1 | 12/2003 | Tanaka | |
| 2005/0127786 A1 | 6/2005 | Hendriks et al. | |
| 2007/0182281 A1 | 8/2007 | Mori | |

(Continued)

FOREIGN PATENT DOCUMENTS

| | | |
|---|---|---|
| EP | 1548855 A2 | 6/2005 |
| EP | 1806793 A1 | 7/2007 |

(Continued)

OTHER PUBLICATIONS

Feb. 12, 2014 Office Action issued in Japanese Patent Application No. 2011-507033 (with translation).

(Continued)

*Primary Examiner* — Mohammed Hasan
(74) *Attorney, Agent, or Firm* — Oliff PLC

(57) ABSTRACT

A piezoelectric actuator includes: a plurality of first piezoelectric elements; a first member that is interposed between the plurality of first piezoelectric elements and that is driven in a first direction by the plurality of first piezoelectric elements; a second piezoelectric element that is disposed on the first member; and a second member that is disposed in contact with the second piezoelectric element and that is driven in a second direction intersecting the first direction by the second piezoelectric element.

21 Claims, 17 Drawing Sheets

(56) References Cited

U.S. PATENT DOCUMENTS

| | | |
|---|---|---|
| 2010/0284098 A1 | 11/2010 | Kuwano |
| 2011/0096423 A1 | 4/2011 | Ashizawa |
| 2012/0087024 A1 | 4/2012 | Kuwano |

FOREIGN PATENT DOCUMENTS

| | | |
|---|---|---|
| JP | 63274894 A | 11/1968 |
| JP | A-59-230473 | 12/1984 |
| JP | A-01-264582 | 10/1989 |
| JP | A-02-087981 | 3/1990 |
| JP | A-02-159982 | 6/1990 |
| JP | 04030481 A | 2/1992 |
| JP | 2003243282 A | 8/2003 |
| JP | A-2005-185094 | 7/2005 |
| JP | 2007185056 A | 7/2007 |
| JP | A-2007-236138 | 9/2007 |

OTHER PUBLICATIONS

Jun. 29, 2010 Search Report issued in International Patent Application No. PCT/JP2010/002376 (with translation).

Jun. 29, 2010 Written Opinion issued in International Patent Application No. PCT/JP2010/002376 (with translation).

Sep. 16, 2013 Office Action issued in Chinese Patent Application No. 201080015449.5 (with translation).

Nov. 2, 2012 Office Action issued in U.S. Appl. No. 13/201,058.

Jun. 7, 2013 Notice of Allowance issued in U.S. Appl. No. 13/201,058.

Sep. 30, 2013 Notice of Allowance issued in U.S. Appl. No. 13/201,058.

Jul. 21, 2015 Office Action issued in Japanese Application No, 2014-212110.

* cited by examiner

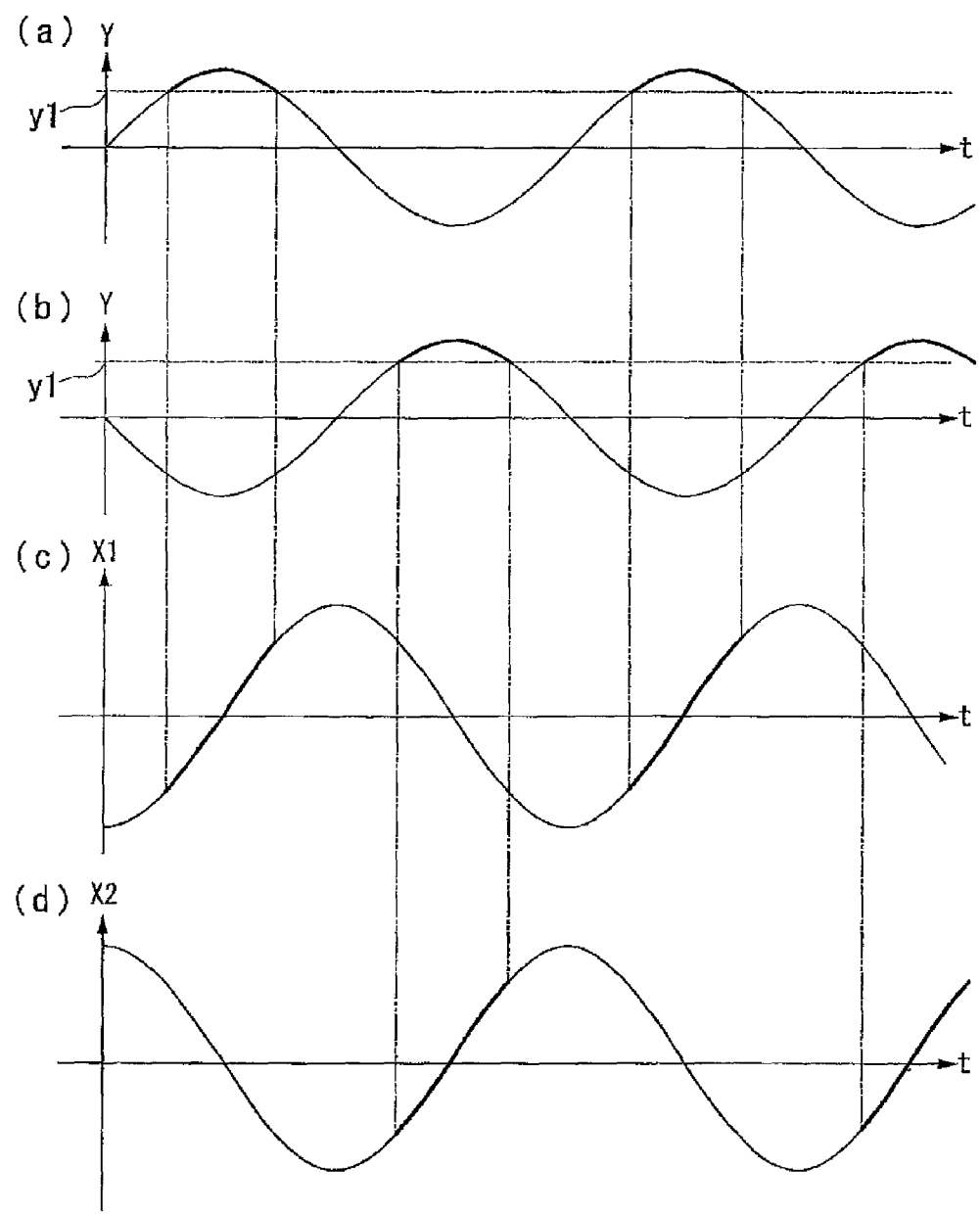

FIG. 15
(a)
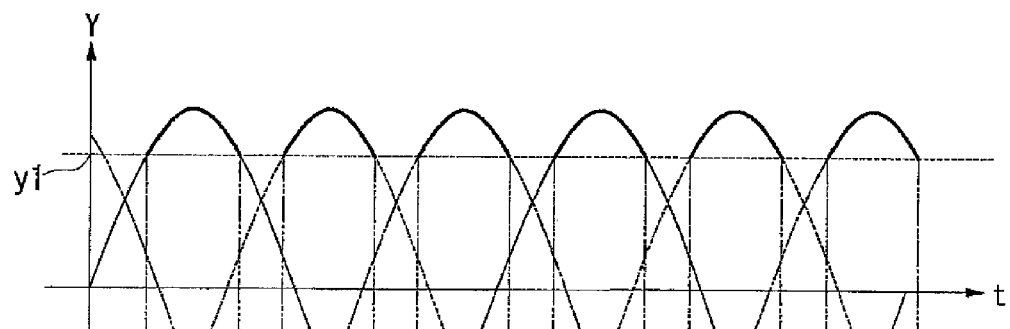
(b)
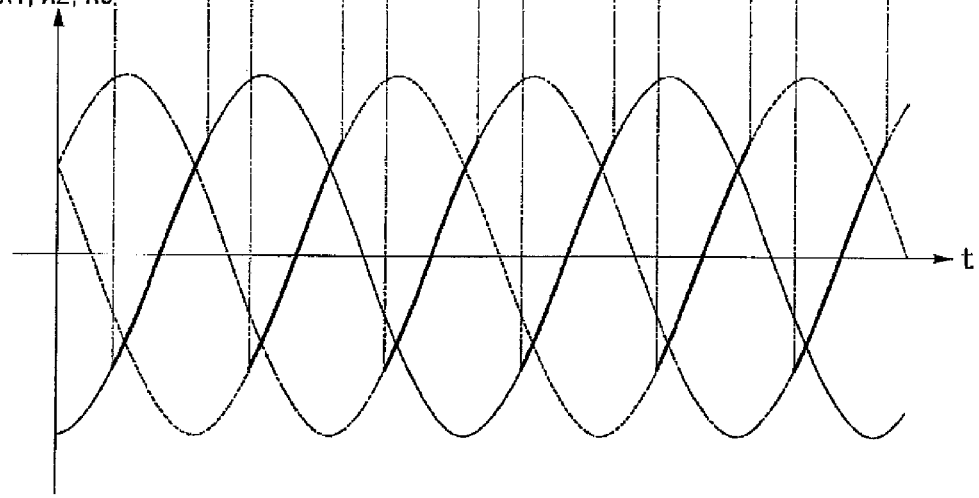

PIEZOELECTRIC ACTUATOR AND LENS BARREL

This is a Continuation of application Ser. No. 13/201,058 (now U.S. Pat. No. 8,693,116), which is the U.S. National Stage of PCT/JP2010/002376 filed Mar. 31, 2010 Now U.S. Pat. No. 8,693,116 B2. The disclosure of each of the prior applications is hereby incorporated by reference herein in its entirety.

TECHNICAL FIELD

The present invention relates to a piezoelectric actuator and a lens barrel.

Priority is claimed on Japanese Patent Application No. 2009-084113 and Japanese Patent Application No. 2009-084114, filed on Mar. 31, 2009, the contents of which are incorporated herein by reference.

BACKGROUND ART

Until now, piezoelectric actuators (driving mechanisms) employing a piezoelectric element have been known. As such a type of piezoelectric actuator, for example, Patent Document 1 below discloses that a driven body is driven by driving plural piezoelectric elements to elliptically move a tip member coming in contact with the driven body. When an XYZ orthogonal coordinate system is set up, the piezoelectric actuator disclosed in Patent Document 1 below drives the driven body in the X axis direction due to the elliptical movement of the tip member parallel to the XZ plane.

PATENT DOCUMENT

[Patent Document 1] Japanese Unexamined Patent Application, First Publication No. 2007-236138

SUMMARY OF THE INVENTION

Problem that the Invention is to Solve

However, the piezoelectric actuator has a problem in that vibrations in two different directions cannot be picked up as independent vibrations. In Patent Document 1 above, since the vibrations of the tip member in the X axis direction and the Z axis direction cannot be picked up as independent vibrations, plural piezoelectric elements may interfere with each other in motion. When plural piezoelectric elements are driven to interfere with each other in motion, the power of the piezoelectric actuator driving the driven member is reduced.

An object of aspects of the present invention is to provide a piezoelectric actuator which can pick up vibrations in two different directions as independent vibrations, and a lens barrel employing the piezoelectric actuator.

Means for Solving the Problem

According to an aspect of the present invention, there is provided a piezoelectric actuator including: a plurality of first piezoelectric elements; a first member that is interposed between opposing faces of the plurality of the first piezoelectric elements and that is driven in a first direction by the plurality of the first piezoelectric elements; a second piezoelectric element that is disposed in the first member; a second member that is disposed in contact with the second piezoelectric element and that is driven in a second direction intersecting the first direction by the second piezoelectric element; and a third member that comes in contact with the second member and that is moved relative to the first member by driving the second member.

According to another aspect of the present invention, there is provided a lens barrel including the above-mentioned piezoelectric actuator.

Effects of the Invention

In the piezoelectric actuator according to aspects of the present invention, it is possible to pick up the vibrations in two different directions as independent vibrations.

BRIEF DESCRIPTION OF THE DRAWINGS

FIG. 14 is a graph illustrating a temporal variation in displacement of the tip portion of the driving member in the piezoelectric actuator.

FIG. 15 is a graph illustrating the temporal variation in displacement of the tip portion of the driving member.

DESCRIPTION OF EMBODIMENTS

A piezoelectric actuator according to an embodiment of the present invention will be described below with reference to the accompanying drawings. The piezoelectric actuator (the driving mechanism) 1 according to this embodiment serves to drive an optical device or an electronic apparatus such as a lens barrel of a camera by performing a relative driving operation of relatively displacing a first part such as a rotor and a second part such as a driving member.

Figure 1:
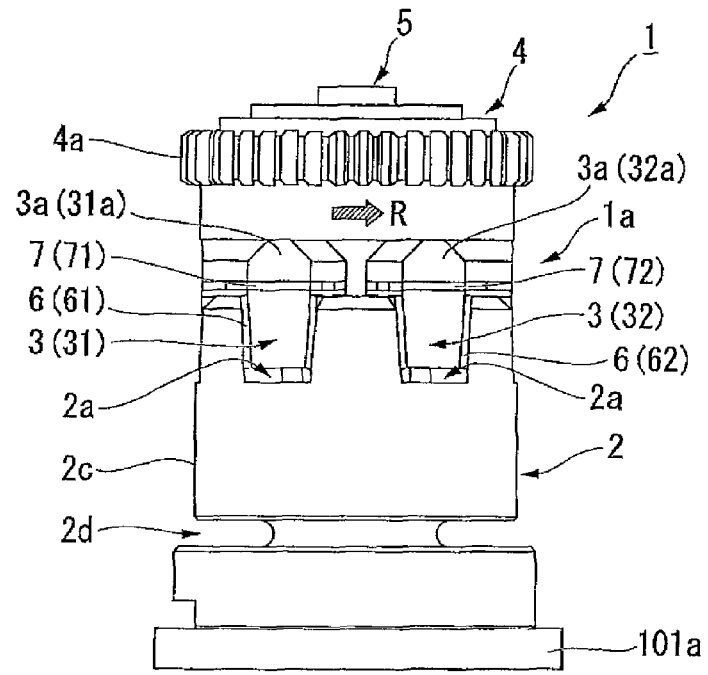
FIG. 1 is a front view illustrating a piezoelectric actuator according to an embodiment of the present invention.
Figure 2:
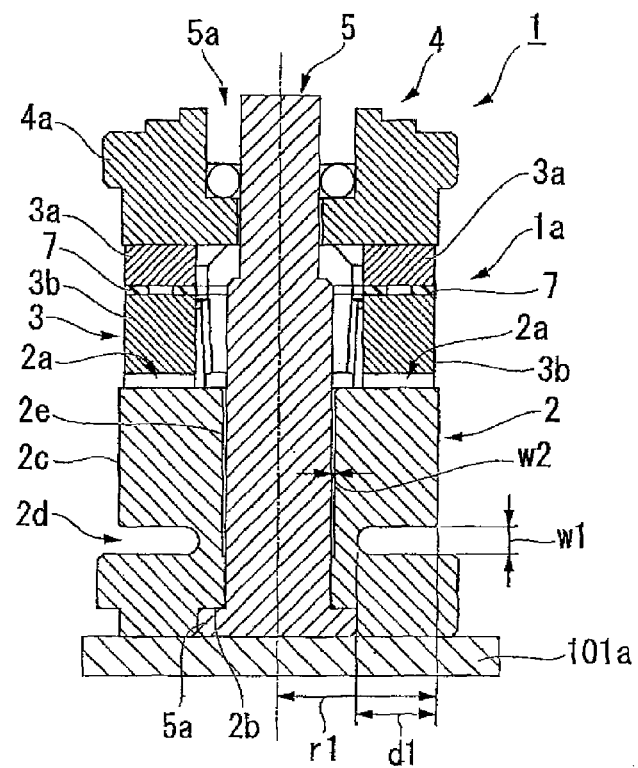
FIG. 2 is a sectional view of the piezoelectric actuator.

FIG. 1 is a front view illustrating the piezoelectric actuator 1 according to this embodiment and FIG. 2 is a sectional view thereof.

As shown in FIGS. 1 and 2, the piezoelectric actuator 1 includes a base member (the fourth member) 2 in which plural holding portions 2a are provided, driving members 3 held in the holding portions 2a, a rotor (the third member) 4 disposed adjacent to the driving members 3, and a support shaft 5 inserted through the base member 2.

The base member 2 is formed in a hollow cylindrical shape out of a metal material such as stainless steel and provided so as to surround the support shaft 5 by inserting the support shaft 5 therethrough.

The rotor 4 is supported (axially supported) by the support shaft 5 with a bearing 5a interposed therebetween and is disposed to be rotatable about the support shaft 5. A toothed wheel 4a used to drive a lens barrel of a camera or the like is formed on the outer circumferential surface of the rotor 4. The surface of the rotor 4 facing the base member 2 is supported by the plural driving members 3.

An end of the base member 2 is fixed to an attaching section 101a, for example, by the use of bolts not shown. A concave portion 2b is formed at the center of the surface of the base member 2 facing the attaching section 101a. A large-diameter portion 5a formed at the base end of the support shaft 5 is inserted (locked) into the concave portion 2b. The support shaft 5 is fixed to the base member 2 and the attaching section 101a by fixing the base member 2 to the attaching section 101a in this state.

Plural holding portions 2a which are concave are disposed at the other end of the base member 2 along the circumferential direction of the base member 2, that is, the rotational direction R of the rotor 4. Each holding portion 2a supports a corresponding driving member 3 from both sides in the direction (second direction) parallel to the rotational direction R of the rotor 4 so as to be perpendicular to the support shaft 5 and holds the driving member 3 so as to drive the driving member 3 in the direction (first direction) parallel to the support shaft 5.

As shown in FIG. 2, a side surface 2c of the base member 2 is disposed to be substantially parallel to the support shaft 5. A groove 2d as a vibration-suppressing portion suppressing the transmission of the vibration from the attaching section 101a to the holding portions 2a is formed in the side surface 2c between the holding portions 2a and an end of the attaching section 101a. That is, the groove 2d is disposed in the side surface 2c of the base member 2 intersecting the direction (the second direction) along the rotational direction R of the rotor 4 so as to be perpendicular to the support shaft 5. The groove 2d is continuously formed in the circumferential direction of the base member 2 and is located at a position closer to the end of the attaching section 101a than the middle between the holding portions 2a and the end of the attaching section 101a.

The depth d1 of the groove 2d is, for example, in the range of 40% to 80% of the radius r1 of the base member 2. This numerical range is only an example and the present invention is not limited to the range. The depth d1 of the groove 2d can be set to, for example, 10, 20, 30, 40, 50, 60, 70, 80, or 90% of the radius r1 of the base member 2. The width w1 of the groove 2d in the direction (the first direction) parallel to the support shaft 5 is greater than the amplitude of the vibration of the base member 2 and is greater than the amplitude of the resonant vibration of a support and drive section (structure) 1a including the first piezoelectric elements 6, the second piezoelectric elements 7, the driving members 3, and the base member 2. For example, the width w1 of the groove 2d can be set to be smaller than the radius of the base member 2.

As shown in FIG. 2, a clearance (vibration-suppressing portion) 2e is provided between the base member 2 and the support shaft 5 serving to suppress the vibration from the attaching section 101a to the holding portions 2a. The clearance 2e is formed from the end of the base member 2 close to the holding portions 2a to the same position as the edge of the groove 2d close to the attaching section 101a in the direction parallel to the support shaft 5. The width w2 of the clearance 2e is greater than the amplitude of the vibration of the base member 2 and is greater than the amplitude of the resonant vibration of the support and drive section 1a to be described later, similarly to the width w1 of the groove 2d.

Figure 3:
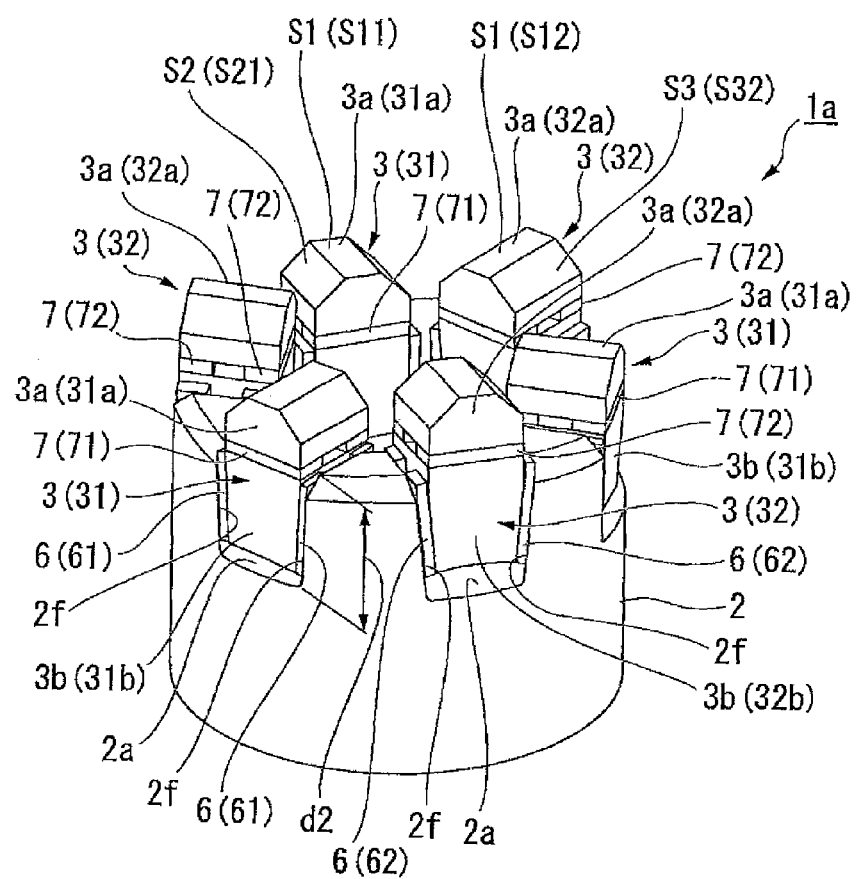
FIG. 3 is a perspective view illustrating a support and drive section of the piezoelectric actuator shown in FIG. 1.
Figure 4:
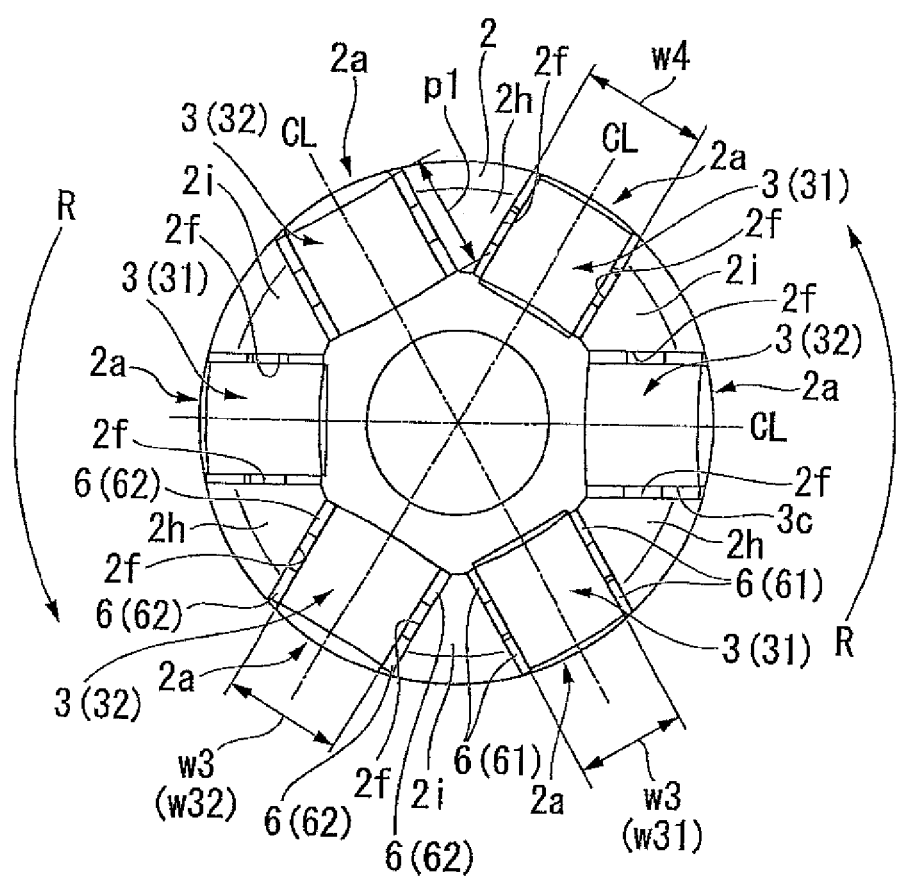
FIG. 4 is a plan view of the support and drive section.

FIG. 3 is a perspective view illustrating the support and drive section 1a of the piezoelectric actuator 1 shown in FIG. 1 and FIG. 4 is plan view thereof.

As shown in FIGS. 3 and 4, each driving member 3 includes a tip portion (second member) 3a having a sectional shape of a mountain-shaped hexagonal prism and a base portion (first member) 3b having a substantially rectangular parallelepiped shape. The tip portion 3a is formed of, for example, stainless steel or the like. The base portion 3b is formed of, for example, light metal alloy or the like. The base portion 3b is supported by the corresponding holding portion 2a so as to be driven in the direction parallel to the support shaft 5. The tip portion 3a protrudes from the corresponding holding portion 2a to support the rotor 4.

The tip portion 3a includes tilted faces S2 and S3 tilted about a contact face S1. The tilted faces S2 and S3 are disposed along a direction intersecting the rotational direction of the rotor 4. The tilted faces S2 and S3 are formed continuously from the contact face S1 of the tip portion 3a in a tapered shape such that the sectional area of the tip portion 3a parallel to the contact face S1 coming in contact with the rotor 4 decreases as it gets closer to the rotor 4. That is, the tip portion 3a has a tapered shape in which the area of the contact face S1 coming in contact with the rotor 4 becomes smaller than the area of the bottom close to the base portion 3b. The tilted faces S2 and S3 may be a curved face with a concave shape or a convex shape.

As shown in FIG. 4, two pairs of first piezoelectric elements 6 and 6 interposing the base portion 3b of the driving member 3 from both ends in the width w3 direction are disposed in the width w3 direction of the driving member 3. The width w3 direction of the driving member 3 is a direction perpendicular to the support shaft 5 and parallel to the rotational direction R of the rotor 4 and is a direction substantially perpendicular to the center lines CL in plan view of the base member 2. Each first piezoelectric element 6 is formed in a long and narrow rectangular shape extending in the depth d2 direction of the corresponding holding portion 2a and is interposed between the base portion 3b and the holding portion 2a.

Accordingly, the first piezoelectric element 6 is disposed between the groove 2d (see FIGS. 1 and 2) formed in the base member 2 and the rotor 4.

The first piezoelectric elements 6 are adhered to the base portion 3b of the driving member 3 and the holding portion 2a, for example, by the use of a conductive adhesive. Two first piezoelectric elements 6 and 6 arranged in the depth p1 direction of the driving member 3 substantially parallel to the center line CL passing through the center of the base member 2 are substantially parallel to each other. The shapes and sizes of the first piezoelectric elements 6 are substantially the same.

As shown in FIG. 3, two second piezoelectric elements 7 and 7 are disposed to be substantially parallel to each other between the base portion 3b and the tip portion 3a of the driving member 3. Each second piezoelectric element 7 has a long and narrow rectangular shape extending substantially parallel to the width w3 direction of the driving member 3. The second piezoelectric elements 7 are interposed between the bottom surface of the tip portion 3a and the top surface of the base portion 3b and are adhered to the bottom surface of the tip portion 3a and the top surface of the base portion 3b, for example, by the use of a conductive adhesive. The shapes and sizes of the second piezoelectric elements 7 are substantially the same.

The first piezoelectric elements 6 and the second piezoelectric elements 7 are formed of, for example, lead zirconate titanate (PZT) and the vibration mode thereof is a thickness-shear vibration mode. That is, the first piezoelectric elements 6 drive the corresponding driving member 3 relative to the base member 2 in the depth d2 direction of the corresponding holding portion 2a substantially parallel to the support shaft 5. The second piezoelectric elements 7 drive the tip portion 3a of the corresponding driving member 3 relative to the base portion 3b and the base member 2 in the width w3 direction (the third direction) of the driving member 3. That is, in this embodiment, the direction (the second direction) in which the driving member 3 is interposed between the first piezoelectric elements 6 and the direction (the third direction) in which the second piezoelectric elements 7 drive the tip portion 3a of the driving member 3 are substantially parallel to each other.

The first piezoelectric elements 6, the second piezoelectric elements 7, the driving members 3, and the base member 2 constitute the support and drive section 1a supporting the rotor 4 and driving the rotor 4 relative to the driving members 3 and the base member 2.

As shown in FIG. 3, the holding portions 2a are disposed at an end of the base member 2. A crown-shaped unevenness is formed in the base member 2. As shown in FIG. 4, the holding portions 2a are uniformly formed substantially every 60° in the circumferential direction of the base member 2. Each holding portion 2a has a pair of support faces 2f and 2f disposed substantially parallel to the center line CL passing through the center of the base member 2 in plan view. The support faces 2f hold the base portion 3b of the driving member 3 so as to interpose the base portion from both ends in the width w4 direction (the second direction) of the holding portion 2a substantially perpendicular to the center line CL of the base member 2 with the pair of first piezoelectric elements 6 and 6 interposed therebetween. In other words, the base member 2 has a circumferential wall disposed at an end in the axis direction. The circumferential wall includes plural grooves (the holding portions 2a) disposed at intervals in the circumferential direction and plural protrusions (the convex portions 2h and 2i, the fourth member) disposed between the neighboring grooves. In this embodiment, the circumferential wall includes six grooves (holding portions 2a) disposed substantially at equivalent intervals (with a pitch of about 60°) and six protrusions (convex portions 2h and 2i) disposed substantially at equivalent intervals (with a pitch of about 60°). Each groove (holding portion 2a) includes the center line CL along the radial direction and two support faces (wall surfaces 2f of the protrusions 2h and 2i in the circumferential direction) substantially parallel to the center line CL. Each protrusion includes an inside surface narrower than an outside surface. In this embodiment, each protrusion has a transverse section of which the width gradually becomes smaller to the inside in the diameter direction. The driving member 3 is disposed in each groove (holding portion 2a). Each driving member 3 is interposed and supported between the neighboring protrusions (convex portions 2h and 2i) with the first piezoelectric elements 6 interposed therebetween. In another embodiment, the circumferential wall can include plural grooves arranged with a pitch other than about 60° and can include plural protrusions arranged with a pitch other than about 60°.

Figure 5A:
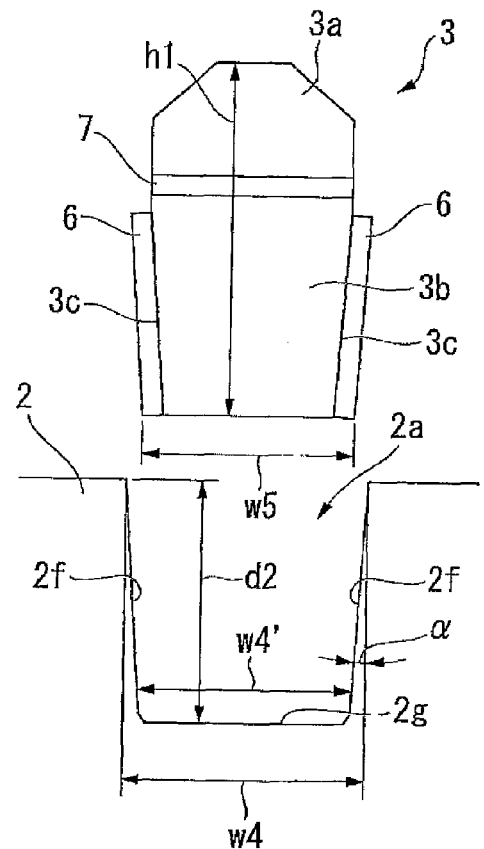
FIG. 5A is an assembly front view illustrating a holding portion and a driving member of the piezoelectric actuator.
Figure 5B:
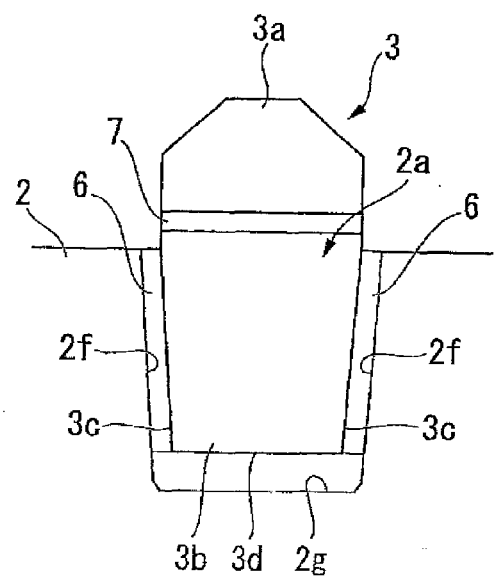
FIG. 5B is a front view of the holding portion and the driving member.

FIG. 5A is an enlarged assembly front view illustrating a holding portion 2a and a driving member 3 and FIG. 5B is an enlarged front view illustrating the holding portion 2a and the driving member 3.

As shown in FIGS. 5A and 5B, the support faces 2f of the concave holding portion 2a formed in the base member 2 are tilted in the depth d2 direction (the first direction) of the holding portion 2a substantially parallel to the support shaft 5 shown in FIG. 2.

The support faces 2f are tilted so that the distance between the opposed support faces 2f and 2f becomes smaller as the distance from the rotor 4 supported by the tip portions 3a of the driving members 3 shown in FIG. 1 becomes greater. In other words, the width w4 of the holding portion 2a becomes smaller as it gets closer to the bottom 2g. The tilt angle α of each support face 2f about the depth d2 direction of the holding portion 2a is preferably in the range of 2° to 6°, in view of the sizes or tolerance of the members. In this embodiment, the tilt angle α of the support faces is 4°.

As shown in FIGS. 5A and 5B, side surfaces 3c of the base portion 3b of the driving member 3 facing the support faces 2f are tilted in the height h1 direction (the first direction) of the driving member 3 substantially parallel to the support shaft 5, similarly to the support faces 2f. Accordingly, the side surfaces 3c of the base portion 3b of the driving member 3 are substantially parallel to the support faces 2f. Here, the total width w5 of the base portion 3b and the pair of first piezoelectric elements 6 and 6 at the end of the base portion 3b close to the bottom 2g of the holding portion 2a is smaller than the width w4 at the opening of the holding portion 2a and is greater than the width w4' midway in the depth d2 direction of the holding portion 2a.

Accordingly, when the base portion 3b of the driving member 3 and the pair of first piezoelectric elements 6 and 6 are held in the holding portion 2a, the base portion 3b is supported by the support faces 2f from both ends in the width w4 direction of the holding portion 2a with the pair of first piezoelectric elements 6 and 6 in a state where the bottom surface 3d of the driving member 3 is separated from the bottom 2g of the holding portion 2a, as shown in FIG. 5B. That is, the support faces 2f are tilted in the depth d2 direction so as to support the driving member 3 from both ends in the width w4 direction (the second direction) of the holding portion 2a and to position the driving member in the depth d2 direction (the first direction) of the holding portion 2a substantially parallel to the support shaft 5.

As shown in FIGS. 3 and 4, each driving member 3 in this embodiment includes a pair of second piezoelectric elements 7 and 7 between the tip portion 3a and the base portion 3b and two pairs of first piezoelectric elements 6 and 6 on the side surfaces of the base portion 3b. The piezoelectric actuator 1 includes two sets of a first set and a second set, each of which includes three driving members 3 and three by two pairs of first piezoelectric elements 6. The driving members 31 of the first set and the driving members 32 of the second set are arranged in the same circumference. The driving members 31 and 32 of each set are arranged at uniform intervals in the rotational direction R of the rotor 4. The driving members 31 and 32 of different sets are alternately (sequentially) arranged in the rotational direction R.

The driving members 31 and 32 of the sets have a uniform height from the base member 2 to the contact faces S11 and S12 so as to bring all the contact faces S11 and S12 into contact with the rotor 4 in the initial state.

In the description below, when the driving members 31 and 32 of the different sets are not distinguished from each other, they are referred to as the driving members 3. The tip portions 31a and 32a, the base portions 31b and 32b, and the contact faces S11 and S12 are similarly referred to as the tip portions 3a, the base portions 3b, and the contact faces S1.

Figure 6A:
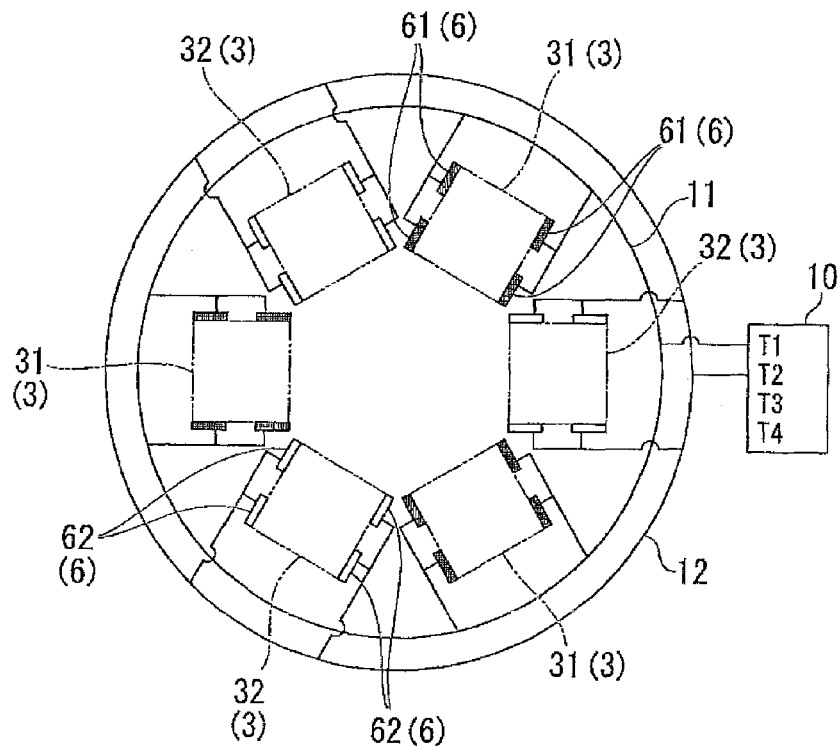
FIG. 6A is a circuit diagram illustrating the piezoelectric actuator.
Figure 6B:
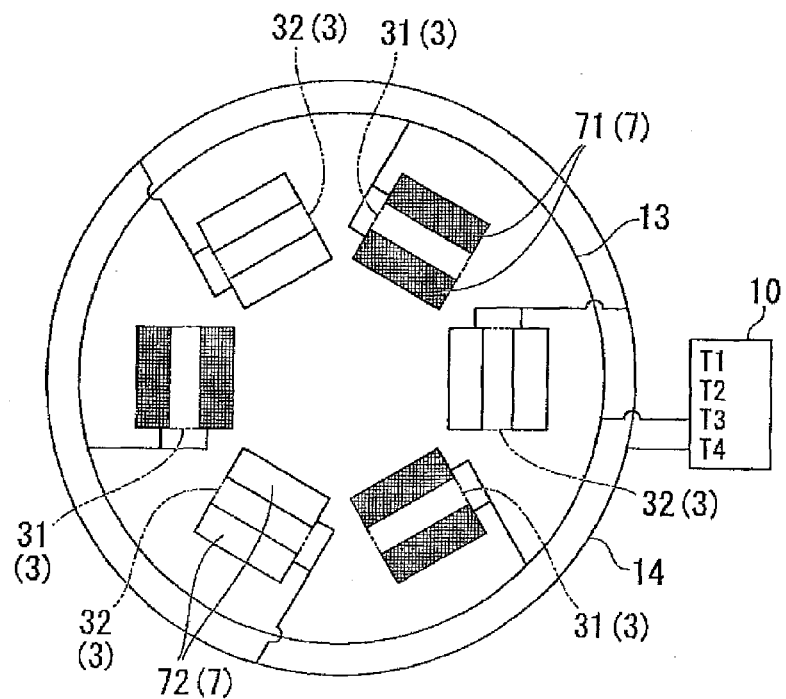
FIG. 6B is a circuit diagram illustrating the piezoelectric actuator.

FIG. 6A is a diagram schematically illustrating the wiring of the first piezoelectric elements 6 and FIG. 6B is a diagram schematically illustrating the wiring of the second piezoelectric elements 7.

As shown in FIGS. 6A and 6B, the piezoelectric actuator 1 according to this embodiment includes a power supply unit 10 supplying voltages to the first piezoelectric elements 6 and the second piezoelectric elements 7. The power supply unit 10 supplies voltages to the first piezoelectric elements 6 and the second piezoelectric elements 7 so that the tip portions 31a and 32a of the driving members 31 and 32 of the first set and the second set shown in FIGS. 3 and 4 sequentially repeat the contact with the rotor 4 shown in FIGS. 1 and 2, the transfer of the rotor 4 in the rotational direction R, the separation from the rotor 4, and the return in the opposite direction of the rotational direction R of the rotor 4.

As shown in FIG. 6A, the first piezoelectric elements 61 of the driving members 31 of the first set are connected to a first terminal T1 of the power supply unit 10 via a first wire 11. The first piezoelectric elements 62 of the driving members 32 of the second set are connected to a second terminal T2 of the power supply unit 10 via a second wire 12.

As shown in FIG. 6B, the second piezoelectric elements 71 of the driving members 31 of the first set are connected to a third terminal T3 of the power supply unit 10 via a third wire 13. The second piezoelectric elements 72 of the driving members 32 of the second set are connected to a fourth terminal T4 of the power supply unit 10 via a fourth wire 14.

Although not shown in FIGS. 6A and 6B, the base portions 31b and 32b of the driving members 31 and 32 are grounded.

Figure 7:
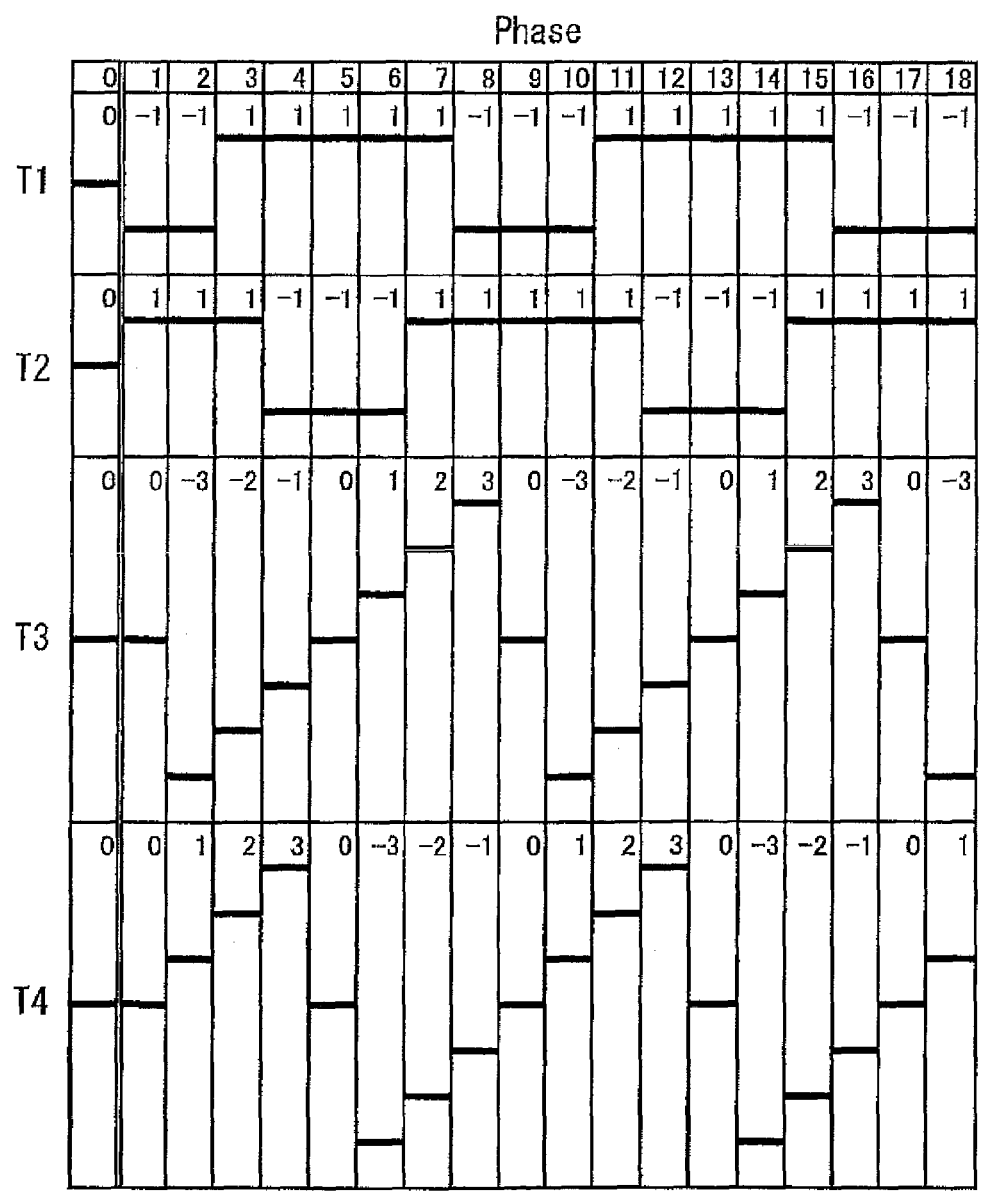
FIG. 7 is a timing chart of a voltage supplied from a power supply unit of the piezoelectric actuator.

FIG. 7 is a timing chart illustrating the voltages generated at the terminals T1, T2, T3, and T4 by the power supply unit 10.

As shown in FIG. 7, at the first terminal T1, the power supply unit 10 generates a voltage of −1.0 V in two phases of Phase 1 to Phase 2, generates a voltage of 1.0 V in five phases of Phase 3 to Phase 7, and generates a voltage of −1.0 V in three phases of Phase 8 to Phase 10. In the subsequent phases, the generation of the voltage of 1.0 V in five phases and the generation of the voltage of −1.0 V in three phases are repeated. That is, the power supply unit 10 generates the voltage with a period of eight phases at the first terminal.

At the second terminal T2, the power supply unit 10 generates a voltage with a phase difference of 180° from the voltage generated at the first terminal T1 and with a period of eight phases similar to the voltage generated at the first terminal T1. That is, the voltage generated at the first terminal and the voltage generated at the second terminal have a phase difference of four phases, which correspond to a half period, from each other.

At the third terminal T3, the power supply unit 10 maintains a voltage in Phase 1 at 0 V, generates a voltage of −3.0 V in Phase 2, and increases the voltage by 1.0 V in the phases of Phase 3 to Phase 8. In the subsequent phases, the voltage generation pattern of Phase 1 to Phase 8 is repeated. That is, the power supply unit 10 generates the voltage with a period of eight phases at the third terminal T3.

At the fourth terminal T4, the power supply unit 10 generates a voltage with a phase difference of 180° from the voltage generated at the third terminal T3 and with a period of eight phases similar to the voltage generated at the third terminal T3. That is, the voltage generated at the third terminal and the voltage generated at the fourth terminal have a phase difference of four phases, which correspond to a half period, from each other.

In this embodiment, the frequencies of the voltages supplied to the first piezoelectric elements 6 and the second piezoelectric elements 7 from the power supply unit 10 are substantially the same as the frequency of the resonant vibration of the support and drive section (structure) 1a including the first piezoelectric elements 6, the second piezoelectric elements 7, the driving members 3, and the base member 2.

The operation of the piezoelectric actuator 1 according to this embodiment will be described below with reference to FIGS. 8 to 11.

Figure 8:
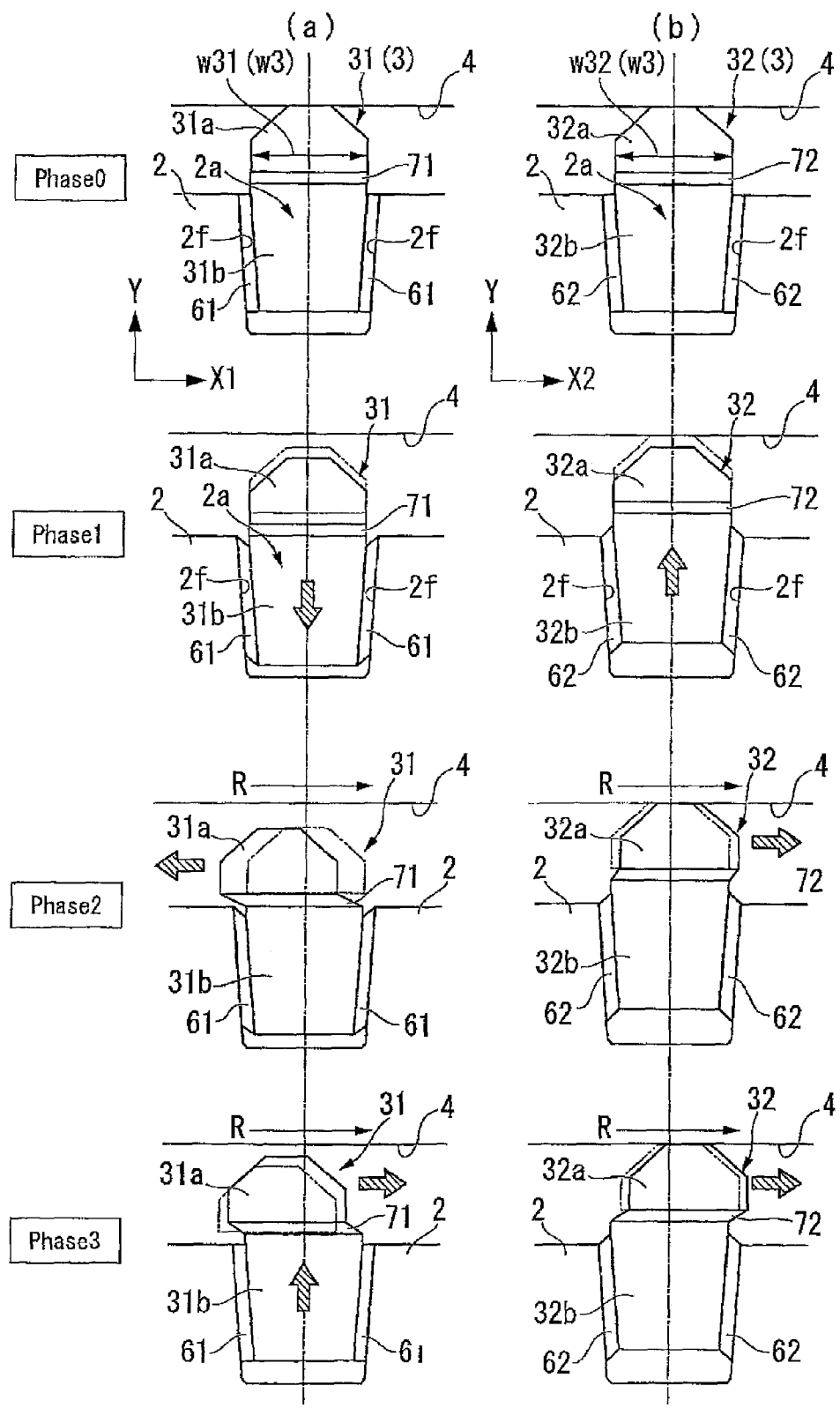
FIG. 8 is a front view illustrating the operation of driving members of the piezoelectric actuator.
Figure 9:
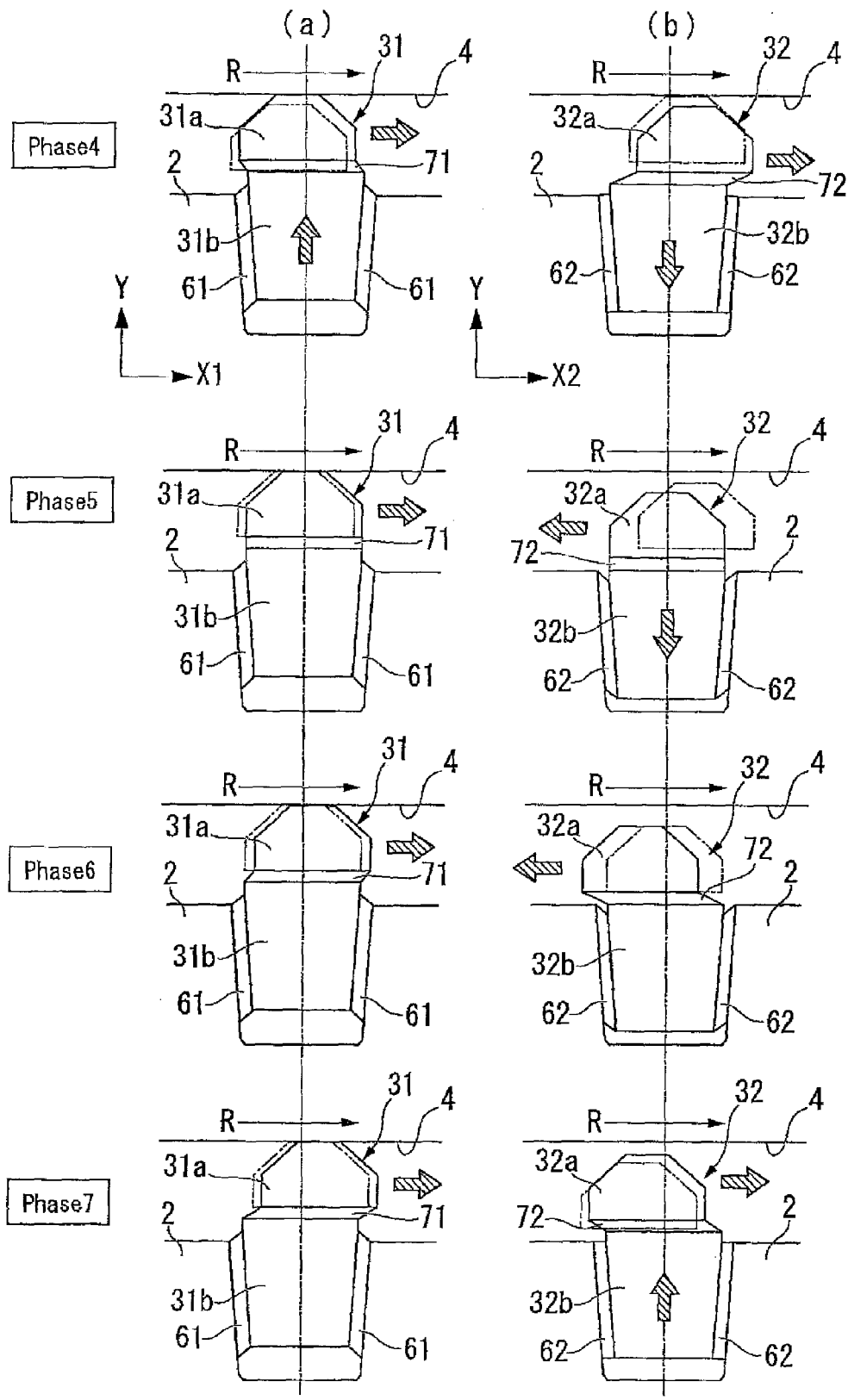
FIG. 9 is a front view illustrating the operation of the driving members.
Figure 10:
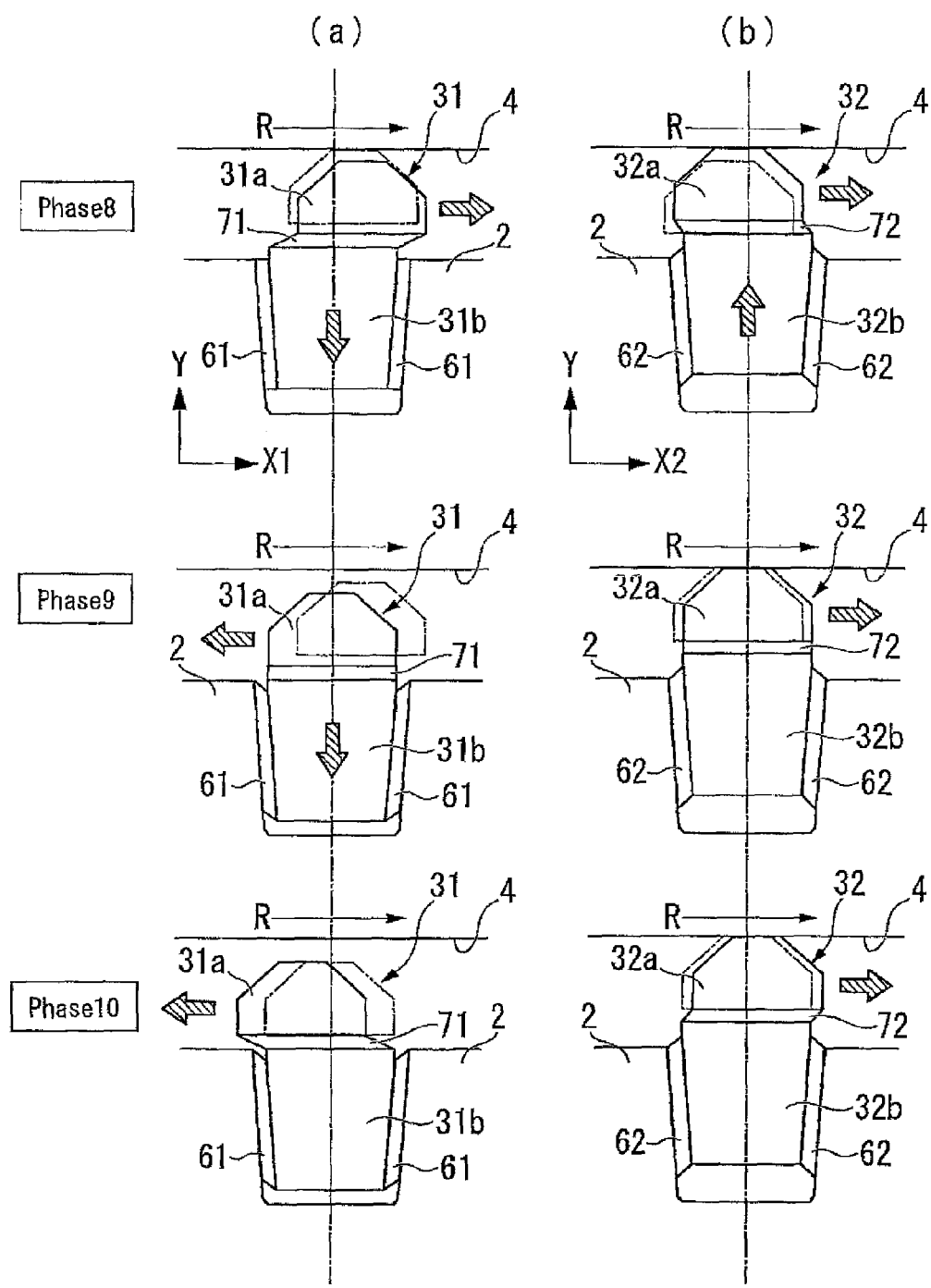
FIG. 10 is a front view illustrating the operation of the driving members.

FIGS. 8 to 10 are enlarged front views illustrating the operations of the driving members 31 and 32 of the first and second sets and the operation of the rotor 4.

Figure 11:
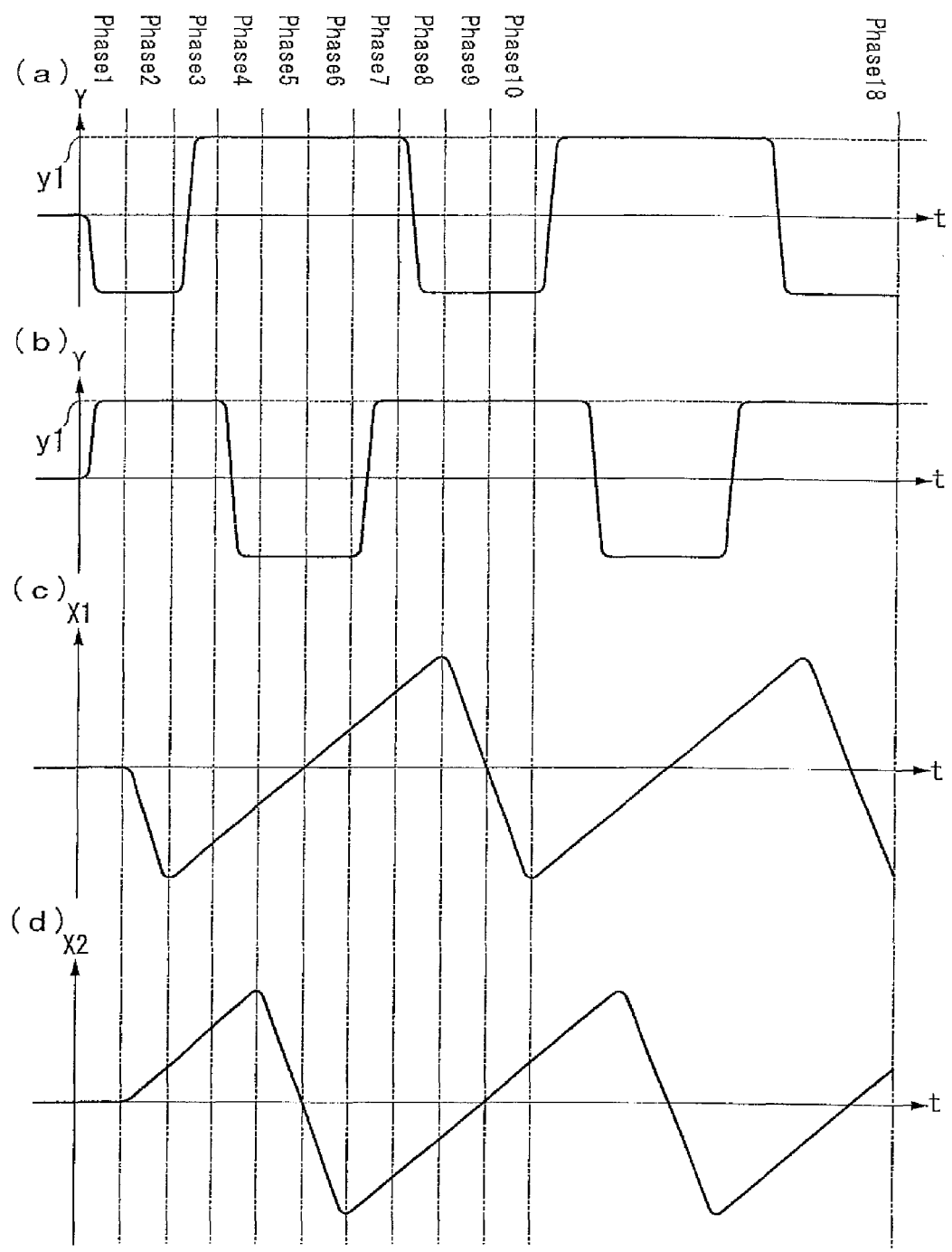
FIG. 11 is a graph illustrating a temporal variation in displacement of a tip portion of a driving member in the piezoelectric actuator shown in FIG. 1.

FIG. 11 is a graph illustrating the relation between the displacements of the tip portions 32a of the driving members 32 of the first and second sets in the axis direction and the time t. In parts (a) and (b) of FIG. 11, the contact position y1 with the rotor 4 in the Y axis direction is marked by broken lines.

In each parts (a) of FIGS. 8 to 10, an orthogonal coordinate system using the width w31 direction (the second direction) of the driving members 3 of the first set along the rotational direction R of the rotor 4 as an X1 direction and the direction (the first direction) parallel to the support shaft 5 as a Y axis direction is used for the description. In each parts (b) of FIGS. 8 to 10, an orthogonal coordinate system using the width w32 direction (the second direction) of the driving members 32 of the second set along the rotational direction R of the rotor 4 as an X2 direction and using the direction (the first direction) parallel to the support shaft 5 as a Y direction is used for the description.

(Phase 0)

As shown in FIG. 7, the power supply unit 10 generates no voltage at the terminals T1, T2, T3, and T4 (0 V) and supplies a voltage of 0 V to the first piezoelectric elements 6 and the second piezoelectric elements 7 (that is, supplies no voltage), in Phase 0.

As shown in parts (a) and (b) of FIG. 8, the driving members 31 of the first set and the driving members 32 of the second set are stationary in a state where the top surfaces of the tip portions 31a and 32a are in contact with the rotor 4, in Phase 0. The rotor 4 is stationary in the state where it is supported by the tip portions 31a and 32a of the driving members 31 and 32.

(Phase 1)

As shown in FIG. 7, the power supply unit 10 generates the voltage of −1.0 V at the first terminal T1 and supplies the voltage to the first piezoelectric elements 61 of the driving members 31 of the first set shown in FIG. 6A via the first wire 11, in Phase 1. As shown in FIG. 7, the power supply unit 10 maintains the voltage of 0 V at the third terminal T3 and supplies the voltage of 0 V to the second piezoelectric elements 71 of the driving members 31 of the first set shown in FIG. 6B via the second wire 12, in Phase 1.

As shown in FIG. 8(a), in Phase 1, the first piezoelectric elements 61 driving the driving members 31 of the first set are deformed in a thickness-shear mode and the base portions 31b of the driving members 31 are moved toward the base member 2 in the Y direction relative to the support faces 2f of the holding portions 2a (in the negative Y axis direction) (see Phase 1 in FIG. 11(a)). As shown in FIG. 8(a), the second piezoelectric elements 71 are not deformed in Phase 1. Accordingly, the tip portions 31a are not moved in the X1 direction (see Phase 1 in FIG. 11(c)). As a result, the tip portions 31a of the driving members 31 are moved in the negative Y axis direction and are separated from the rotor 4.

As shown in FIG. 7, the power supply unit 10 generates the voltage of 1.0 V at the second terminal T2 and supplies the voltage to the first piezoelectric elements 62 of the driving members 32 of the second set shown in FIG. 6A via the second wire 12, in Phase 1. As shown in FIG. 7, the power supply unit 10 maintains the voltage of 0 V at the fourth terminal T4 and supplies the voltage of 0 V to the second piezoelectric elements 72 of the driving members 32 of the second set shown in FIG. 6B via the fourth wire, in Phase 1.

As shown in FIG. 8(b), in Phase 1, the first piezoelectric elements 62 driving the driving members 32 of the second set are deformed in the thickness-shear mode and the base portions 32b of the driving members 32 are moved toward the rotor 4 in the Y direction relative to the support faces 2f of the holding portions 2a (in the positive Y axis direction) (see Phase 1 in FIG. 11(b)). As shown in FIG. 8(b), the second piezoelectric elements 72 are not deformed in Phase 1. Accordingly, the tip portions 32a are not moved in the X2 direction (see Phase 1 in FIG. 11(d)). As a result, the driving members 32 are moved in the positive Y axis direction, and the tip portions 32a push up the rotor 4 in the positive Y axis direction.

That is, in Phase 1, the tip portions 31a of the driving members 31 of the first set are moved in the negative Y axis direction and are separated from the rotor 4, as shown in FIG. 8(a). At the same time, as shown in FIG. 8(b), the tip portions 32a of the driving members 32 of the second set come in contact with the rotor 4, support the rotor 4, and push up the rotor 4 in the positive Y axis direction.

(Phase 2)

As shown in FIG. 7, the power supply unit 10 maintains the voltage of −1.0 V at the first terminal T1 and maintains the voltage supplied to the first piezoelectric elements 61 of the driving members 31 of the first set shown in FIG. 6A via the first wire 11, in Phase 2. As shown in FIG. 7, the power supply unit 10 generates the voltage of −3.0 V at the third terminal T3 and supplies the voltage to the second piezoelectric elements 71 of the driving members 31 of the first set shown in FIG. 6B via the third wire 13, in Phase 2.

As shown in FIG. 8(a), in Phase 2, the deformation of the first piezoelectric elements 61 driving the driving members 31 of the first set in the Y direction is maintained and the separation of the tip portions 31a from the rotor 4 is maintained (see Phase 2 in FIG. 11(a)). In this state, as shown in FIG. 8(a), the second piezoelectric elements 71 are deformed in the thickness-shear mode in Phase 2. Accordingly, the tip portions 31a are moved in the negative X1 axis direction relative to the base portions 31b and the base member 2 (see FIG. 11(c)). The movement of the tip portions 31a at this time is proportional to the absolute value of the voltage supplied to the second piezoelectric elements 71.

As shown in FIG. 7, the power supply unit 10 maintains the voltage of 1.0 V at the second terminal T2 and maintains the voltage supplied to the first piezoelectric elements 62 of the driving members 32 of the second set shown in FIG. 6A via the second wire 12, in Phase 2. As shown in FIG. 7, the power supply unit 10 generates the voltage of 1.0 V at the fourth terminal T4 and supplies the voltage to the second piezoelectric elements 72 of the driving members 32 of the second set shown in FIG. 6B via the fourth wire 14, in Phase 2.

As shown in FIG. 8(b), in Phase 2, the deformation of the first piezoelectric elements 62 driving the driving members 32 of the second set in the Y direction is maintained and the contact of the tip portions 3a with the rotor 4 is maintained (see Phase 2 in FIG. 11(b)). In this state, as shown in FIG. 8(b), the second piezoelectric elements 72 are deformed in the thickness-shear mode in Phase 2. Accordingly, the tip portions 32a are moved in the positive X2 axis direction relative to the base portions 32b and the base member 2 (see Phase 2 in FIG. 11(d)). The movement of the tip portions 32a at this time is proportional to the absolute value of the voltage and is thus smaller than the movement of the tip portions 31a of the first set in the negative X1 axis direction.

That is, in Phase 2, by the movement of the tip portions 32a of the driving members 32 of the second set in the positive X2 axis direction, a frictional force acts between the top surfaces of the tip portions 32a and the bottom of the rotor 4 as shown in FIG. 8(b). Here, as shown in FIGS. 3 and 4, the driving members 32 of the second set are arranged in the circumferential direction of the base member 2 along the rotational direction R of the rotor 4. The tip portions 32a are deformed in the width w32 direction (the X2 direction) of the driving members 32 along the rotational direction R of the rotor 4. Accordingly, the rotor 4 is driven in the rotational direction R by the tip portions 32a of the driving members 32 and thus starts the rotation about the support shaft 5 shown in FIGS. 1 and 2.

(Phase 3)

As shown in FIG. 7, the power supply unit 10 generates the voltage of 1.0 V inverted in sign at the first terminal T1 and supplies the voltage to the first piezoelectric elements 61 of the driving members 31 of the first set shown in FIG. 6A via the first wire 11, in Phase 3. As shown in FIG. 7, the power supply unit 10 generates the voltage of −2.0 V at the third terminal T3 and supplies the voltage to the second piezoelectric elements 71 of the driving members 31 of the first set shown in FIG. 6B via the third wire 13, in Phase 3.

As shown in FIG. 8(a), in Phase 3, the first piezoelectric elements 61 driving the driving members 31 of the first set are reversely deformed in the thickness-shear mode and the base portions 31b of the driving members 31 are moved in the positive Y axis direction (see Phase 3 in FIG. 11(a)). As shown in FIG. 8(a), the deformation of the second piezoelectric elements 71 in the negative X1 axis direction is reduced in Phase 3. Accordingly, the tip portions 31a are moved in the positive X1 axis direction relative to the base portions 31b and the base member 2 (see Phase 3 in FIG. 11(c)). The movement at this time is proportional to the voltage difference between −2.0 V newly supplied in Phase 3 and −3.0 V supplied in Phase 2.

As shown in FIG. 7, the power supply unit 10 maintains the voltage of the second terminal T2 and maintains the voltage supplied to the first piezoelectric elements 62 of the driving members 32 of the second set shown in FIG. 6A via the second wire 12, in Phase 3. As shown in FIG. 7, the power supply unit 10 generates the voltage of 2.0 V at the fourth terminal T4 and supplies the voltage to the second piezoelectric elements 72 of the driving members 32 of the second set shown in FIG. 6B via the fourth wire 14, in Phase 3.

As shown in FIG. 8(b), in Phase 3, the deformation of the first piezoelectric elements 62 driving the driving members 32 of the second set is maintained and the contact of the tip portions 32a with the rotor 4 is maintained (see Phase 3 in FIG. 11(b)). In this state, as shown in FIG. 8(b), the second piezoelectric elements 72 are deformed in the thickness-shear mode in Phase 3. Accordingly, the tip portions 32a are moved in the positive X2 axis direction relative to the base portions 32b and the base member 2 (see Phase 3 in FIG. 11(d)). The movement at this time is proportional to the absolute value of the voltage difference between 2.0 V newly supplied in Phase 3 and 1.0 V supplied in Phase 2.

That is, in Phase 3, the tip portions 31a of the driving members 31 of the first set are moved in the positive X1 axis direction along the rotational direction R of the rotor 4 and in the positive Y axis direction, and come close to the rotor 4, as shown in FIG. 8(a). At the same time, as shown in FIG. 8(b), the tip portions 32a of the driving members 32 of the second set come in contact with the rotor 4, supports the rotor 4, and drives the rotor 4 in the rotational direction R similarly to the driving members 31 of the first set.

(Phase 4)

As shown in FIG. 7, the power supply unit 10 maintains the voltage of 1.0 V at the first terminal T1 and maintains the voltage supplied to the first piezoelectric elements 61 of the driving members 31 of the first set shown in FIG. 6A via the first wire 11, in Phase 4. As shown in FIG. 7, the power supply unit 10 generates the voltage of −1.0 V at the third terminal T3 and supplies the voltage to the second piezoelectric elements 71 of the driving members 31 of the first set shown in FIG. 6B via the third wire 13, in Phase 4.

As shown in FIG. 9(a), in Phase 4, the deformation of the first piezoelectric elements 61 driving the driving members 31 of the first set in the positive Y axis direction is advanced and the tip portions 31a come in contact with the rotor 4 (see Phase 4 in FIG. 11(a)). At the same time, as shown in FIG. 9(a), the deformation of the second piezoelectric elements 71 in the negative X1 axis direction is reduced in Phase 4. Accordingly, the tip portions 31a are moved in the positive X1 axis direction relative to the base portions 31b and the base member 2 (see Phase 4 in FIG. 11(c)). The movement at this time is proportional to the absolute value of the voltage difference between −1.0 V newly supplied in Phase 4 and −2.0 V supplied in Phase 3.

As shown in FIG. 7, the power supply unit 10 generates the voltage of −1.0 V inverted in sign at the second terminal T2 and supplies the voltage to the first piezoelectric elements 62 of the driving members 32 of the second set shown in FIG. 6A via the second wire 12, in Phase 4. As shown in FIG. 7, the power supply unit 10 generates the voltage of 3.0 V at the fourth terminal T4 and supplies the voltage to the second piezoelectric elements 72 of the driving members 32 of the second set shown in FIG. 6B via the fourth wire 14, in Phase 4.

As shown in FIG. 9(b), in Phase 4, the first piezoelectric elements 62 driving the driving members 32 of the second set are reversely deformed in the thickness-shear mode and moves the base portions 32b of the driving members 32 in the negative Y axis direction (see Phase 4 in FIG. 11(b)). As shown in FIG. 9(b), the deformation of the second piezoelectric elements 72 in the positive X2 axis direction is increased in Phase 4. Accordingly, the tip portions 32a are moved in the positive X2 axis direction relative to the base portions 32b and the base member 2 (see Phase 4 in FIG. 11(d)). The movement at this time is proportional to the absolute value of the voltage difference between 3.0 V newly supplied in Phase 4 and 2.0 V supplied in Phase 2.

That is, in Phase 4, the tip portions 31a of the driving members 31 of the first set are moved in the positive X1 axis direction along the rotational direction R of the rotor 4, come in contact with the rotor 4, and supports and drives the rotor 4 in the rotational direction R, as shown in FIG. 9(a). At the same time, as shown in FIG. 9(b), the tip portions 32a of the driving members 32 of the second set are moved in the positive X2 axis direction along the rotational direction R of the rotor 4 and in the negative Y axis direction, and are separated from the rotor 4. Accordingly, the rotor 4 is driven in the rotational direction R by the tip portions 31a and 32a of the driving members 31 and 32 of the first and second set. At the same time, the rotor 4 is handed over from the tip portions 32a of the driving members 32 of the second set to the tip portions 31a of the driving members 31 of the first set.

At this time, as shown in parts (a) and (b) of FIG. 11, both driving members 31 and 32 may be separated from the rotor 4 for a very short time in Phase 4. In this case, the rotor 4 is hardly displaced in the Y direction due to the inertia and stays at the position where it has been supported by the tip portions 32a of the driving members 32 of the second set. Accordingly, the rotor 4 is supported in the Y direction and driven in the rotational direction R by the tip portions 31a of the driving members 31 of the first set, in the state where it is maintained substantially at a constant position in the Y direction and is driven in the rotational direction R. As a result, the rotor 4 continues to rotate about the support shaft 5 substantially at the constant position in the Y direction.

(Phase 5)

As shown in FIG. 7, the power supply unit 10 maintains the voltage of 1.0 V at the first terminal T1 and maintains the voltage supplied to the first piezoelectric elements 61 of the driving members 31 of the first set shown in FIG. 6A via the first wire 11, in Phase 5. As shown in FIG. 7, the power supply unit 10 generates the voltage of 0 V at the third terminal T3 and supplies the voltage of 0 V to the second piezoelectric elements 71 of the driving members 31 of the first set shown in FIG. 6B via the third wire 13, in Phase 5.

As shown in FIG. 9(a), in Phase 5, the deformation of the first piezoelectric elements 61 driving the driving members 31 of the first set in the Y axis direction is maintained and the contact of the tip portions 31a with the rotor 4 is maintained (see Phase 5 in FIG. 11(a)). In this state, as shown in FIG. 9(a), the second piezoelectric elements 71 is returned to the original shape in Phase 5. Accordingly, the tip portions 31a are moved in the positive X1 axis direction relative to the base portions 31b and the base member 2 (see Phase 5 in FIG. 11(c)). The movement of the tip portions 31a at this time is proportional to the absolute value of the voltage supplied to the second piezoelectric elements 71 in Phase 4.

As shown in FIG. 7, the power supply unit 10 maintains the voltage of the second terminal T2 at −1.0 V and maintains the voltage supplied to the first piezoelectric elements 62 of the driving members 32 of the second set shown in FIG. 6A via the second wire 12, in Phase 5. As shown in FIG. 7, the power supply unit 10 generates the voltage of 0 V at the fourth terminal T4 and supplies the voltage of 0 V to the second piezoelectric elements 72 of the driving members 32 of the second set shown in FIG. 6B via the fourth wire 14, in Phase 5.

As shown in FIG. 9(b), in Phase 5, the deformation of the first piezoelectric elements 62 driving the driving members 32 of the second set in the Y axis direction is advanced and the tip portions 32a are further separated from the rotor 4 (see Phase 5 in FIG. 11(b)). At the same time, as shown in FIG. 9(b), the second piezoelectric elements 72 are returned to the original shape in Phase 5. Accordingly, the tip portions 32a are moved in the negative X2 axis direction relative to the base portions 32b and the base member 2 (see Phase 5 in FIG. 11(d)). The movement of the tip portions 32a at this time is proportional to the absolute value of the voltage supplied to the second piezoelectric elements 72 in Phase 4.

That is, in Phase 5, the tip portions 31a of the driving members 31 of the first set maintains the contact with the rotor 4, are moved in the positive X1 axis direction while supporting the rotor 4, and drives the rotor 4 in the rotational direction R, as shown in FIG. 9(a). At the same time, as shown in FIG. 9(b), the tip portions 32a of the driving members 32 of the second set are moved in the negative Y axis direction, maintains the separation from the rotor 4, and are moved in the negative X2 axis direction which is opposite to the rotational direction R of the rotor 4 relative to the base portions 32b and the base member 2.

(Phase 6)

As shown in FIG. 7, the power supply unit 10 maintains the voltage of 1.0 V at the first terminal T1 and maintains the voltage supplied to the first piezoelectric elements 61 of the driving members 31 of the first set shown in FIG. 6A via the first wire 11, in Phase 6. As shown in FIG. 7, the power supply unit 10 generates the voltage of 1.0 V at the third terminal T3 and supplies the voltage to the second piezoelectric elements 71 of the driving members 31 of the first set shown in FIG. 6B via the third wire 13, in Phase 6.

As shown in FIG. 9(a), in Phase 6, the deformation of the first piezoelectric elements 61 driving the driving members 31 of the first set in the Y axis direction is maintained and the contact of the tip portions 31a with the rotor 4 is maintained (see Phase 6 in FIG. 11(a)). In this state, as shown in FIG. 9(a), the second piezoelectric elements 71 are deformed in the thickness-shear mode in Phase 6. Accordingly, the tip portions 31a are moved in the positive X1 axis direction relative to the base portions 31b and the base member 2 (see Phase 6 in FIG. 11(c)). The movement at this time is proportional to the absolute value of the voltage newly supplied in Phase 6.

As shown in FIG. 7, the power supply unit 10 maintains the voltage of the second terminal T2 at −1.0 V and maintains the voltage supplied to the first piezoelectric elements 62 of the driving members 32 of the second set shown in FIG. 6A via the second wire 12, in Phase 6. As shown in FIG. 7, the power supply unit 10 generates the voltage of −3.0 V at the fourth terminal T4 and supplies the voltage to the second piezoelectric elements 72 of the driving members 32 of the second set shown in FIG. 6B via the fourth wire 14, in Phase 6.

As shown in FIG. 9(b), in Phase 6, the deformation of the first piezoelectric elements 62 driving the driving members 32 of the second set in the Y direction is maintained and the separation of the tip portions 32a from the rotor 4 is maintained (see Phase 6 in FIG. 11(b)). At the same time, as shown in FIG. 9(b), the second piezoelectric elements 72 are deformed in the thickness-shear mode in Phase 6. Accordingly, the tip portions 32a are moved in the negative X2 axis direction relative to the base portions 32b and the base member 2 (see Phase 6 in FIG. 11(d)). The movement of the tip portions 32a at this time is proportional to the absolute value of the voltage supplied to the second piezoelectric elements 72.

That is, in Phase 6, the tip portions 31a of the driving members 31 of the first set maintains the contact with the rotor 4, are moved in the positive X1 axis direction while supporting the rotor 4, and drives the rotor 4 in the rotational direction R, as shown in FIG. 9(a). At the same time, as shown in FIG. 9(b), the tip portions 32a of the driving members 32 of the second set maintains the separation from the rotor 4 and are further moved in the negative X2 axis direction which is opposite to the rotational direction R of the rotor 4 relative to the base portions 32b and the base member 2.

(Phase 7)

As shown in FIG. 7, the power supply unit 10 maintains the voltage of 1.0 V at the first terminal T1 and maintains the voltage supplied to the first piezoelectric elements 61 of the driving members 31 of the first set shown in FIG. 6A via the first wire 11, in Phase 7. As shown in FIG. 7, the power supply unit 10 generates the voltage of 2.0 V at the third terminal T3 and supplies the voltage to the second piezoelectric elements 71 of the driving members 31 of the first set shown in FIG. 6B via the third wire 13, in Phase 7.

As shown in FIG. 9(a), in Phase 7, the deformation of the first piezoelectric elements 61 driving the driving members 31 of the first set is maintained and the contact of the tip portions 31a with the rotor 4 is maintained (see Phase 7 in FIG. 11(a)). In this state, as shown in FIG. 9(a), the second piezoelectric elements 71 are deformed in the thickness-shear mode in Phase 7. Accordingly, the tip portions 31a are moved in the positive X1 axis direction relative to the base portions 31b and the base member 2 (see Phase 7 in FIG. 11(c)). The movement at this time is proportional to the absolute value of the voltage difference between 2.0 V newly supplied in Phase 7 and 1.0 V supplied in Phase 6.

As shown in FIG. 7, the power supply unit 10 generates the voltage of 1.0 V inverted in sign at the second terminal T2 and supplies the voltage to the first piezoelectric elements 62 of the driving members 32 of the second set shown in FIG. 6A via the second wire 12, in Phase 7. As shown in FIG. 7, the power supply unit 10 generates the voltage of −2.0 V at the fourth terminal T4 and supplies the voltage to the second piezoelectric elements 72 of the driving members 32 of the second set shown in FIG. 6B via the fourth wire 14, in Phase 7.

As shown in FIG. 9(b), in Phase 7, the first piezoelectric elements 62 driving the driving members 32 of the second set are reversely deformed in the thickness-shear mode and moves the base portions 32b of the driving members 32 in the positive Y axis direction (see Phase 7 in FIG. 11(b)). At the same time, as shown in FIG. 9(b), the deformation of the second piezoelectric elements 72 in the negative X2 axis direction is reduced in Phase 7. Accordingly, the tip portions 32a are moved in the positive X2 axis direction relative to the base portions 32b and the base member 2 (see Phase 7 in FIG. 11(d)). The movement at this time is proportional to the absolute value of the voltage difference between −2.0 V newly supplied in Phase 7 and −3.0 V supplied in Phase 6.

That is, in Phase 7, the tip portions 31a of the driving members 31 of the first set maintains the contact with the rotor 4 and drives the rotor 4 in the rotational direction R while supporting the rotor 4, as shown in FIG. 9(a). At the same time, as shown in FIG. 9(b), the tip portions 32a of the driving members 32 of the second set are moved in the positive X2 axis direction along the rotational direction R of the rotor 4 and in the positive Y axis direction and go close to the rotor 4.

(Phase 8)

As shown in FIG. 7, the power supply unit 10 generates the voltage of −1.0 V inverted in sign at the first terminal T1 and supplies the voltage to the first piezoelectric elements 62 of the driving members 32 of the second set shown in FIG. 6A via the first wire 11, in Phase 8. As shown in FIG. 7, the power supply unit 10 generates the voltage of 3.0 V at the third terminal T3 and supplies the voltage to the second piezoelectric elements 72 of the driving members 32 of the second set shown in FIG. 6B via the third wire 13, in Phase 8.

As shown in FIG. 10(a), in Phase 8, the first piezoelectric elements 61 driving the driving members 31 of the first set are reversely deformed in the thickness-shear mode and move the base portions 3b of the driving members 3 in the negative Y axis direction (see Phase 8 in FIG. 11(a)). At the same time, as shown in FIG. 10(a), the deformation of the second piezoelectric elements 71 in the positive X1 axis direction is increased in Phase 8. Accordingly, the tip portions 31a are moved in the positive X1 axis direction relative to the base portions 31b and the base member 2 (see Phase 8 in FIG. 11(c)). The movement at this time is proportional to the voltage difference between 3.0 V newly supplied in Phase 8 and 2.0 V supplied in Phase 7.

As shown in FIG. 7, the power supply unit 10 maintains the voltage of the second terminal T2 at 1.0 V and maintains the voltage supplied to the first piezoelectric elements 62 of the driving members 32 of the second set shown in FIG. 6A via the second wire 12, in Phase 8. As shown in FIG. 7, the power supply unit 10 generates the voltage of −1.0 V at the fourth terminal T4 and supplies the voltage to the second piezoelectric elements 72 of the driving members 32 of the second set shown in FIG. 6B via the fourth wire 14, in Phase 8.

As shown in FIG. 10(b), in Phase 8, the deformation of the first piezoelectric elements 62 driving the driving members 32 of the second set is advanced and the tip portions 32a thus come in contact with the rotor 4 (see Phase 8 in FIG. 11(b)). At the same time, as shown in FIG. 10(b), the deformation of the second piezoelectric elements 72 in the negative X2 axis direction is reduced in Phase 8. Accordingly, the tip portions 32a are moved in the positive X2 axis direction relative to the base portions 32b and the base member 2 (see Phase 8 in FIG. 11(d)). The movement at this time is proportional to the absolute value of the voltage difference between −1.0 V newly supplied in Phase 8 and −2.0 V supplied in Phase 7.

That is, in Phase 8, the tip portions 31a of the driving members 31 of the first set are moved in the positive X1 axis direction along the rotational direction R of the rotor 4 and in the negative Y axis direction, and are separated from the rotor 4, as shown in FIG. 10(a). At the same time, as shown in FIG. 10(b), the tip portions 32a of the driving members 32 of the second set is moved to the positive X2 axis direction along the rotational direction R of the rotor 4 to come in contact with the rotor 4, support and drive the rotor 4 in the rotational direction R. Accordingly, the rotor 4 is driven in the rotational direction R by the tip portions 31a and 32a of the driving members 31 and 32 of the first and second set. At the same time, the rotor 4 is handed over from the tip portions 31a of the driving members 31 of the first set to the tip portions 32a of the driving members 32 of the second set.

At this time, as shown in parts (a) and (b) of FIG. 11, both driving members 31 and 32 may be separated from the rotor 4 for a very short time in Phase 8. In this case, the rotor 4 is hardly displaced in the Y direction due to the inertia and stays at the position where it has been supported by the tip portions 31a of the driving members 31 of the first set. Accordingly, the rotor 4 is supported in the Y direction and driven in the rotational direction R by the tip portions 32a of the driving members 32 of the second set, in the state where it is maintained substantially at a constant position in the Y direction and is driven in the rotational direction R. As a result, the rotor 4 continues to rotate about the support shaft 5 substantially at the constant position in the Y direction.

(Phase 9)

As shown in FIG. 7, the power supply unit 10 maintains the voltage of −1.0 V at the first terminal T1 and maintains the voltage supplied to the first piezoelectric elements 61 of the driving members 31 of the first set shown in FIG. 6A via the first wire 11, in Phase 9. As shown in FIG. 7, the power supply unit 10 generates the voltage of 0 V at the third terminal T3 and supplies the voltage of 0 V to the second piezoelectric elements 71 of the driving members 31 of the first set shown in FIG. 6B via the third wire 13, in Phase 9.

As shown in FIG. 10(a), in Phase 9, the deformation of the first piezoelectric elements 61 driving the driving members 31 of the first set in the Y direction is advanced and the tip portions 31a are further separated from the rotor 4 (see Phase 9 in FIG. 11(a)). At the same time, as shown in FIG. 10(a), the second piezoelectric elements 71 are returned to the original shape in Phase 9. Accordingly, the tip portions 31a are moved in the negative X1 axis direction relative to the base portions 31b and the base member 2 (see Phase 9 in FIG. 11(c)). The movement of the tip portions 31a at this time is proportional to the absolute value of the voltage supplied to the second piezoelectric elements 7 in Phase 8.

As shown in FIG. 7, the power supply unit 10 maintains the voltage of 1.0 V at the second terminal T2 and maintains the voltage supplied to the first piezoelectric elements 62 of the driving members 32 of the second set shown in FIG. 6A via the second wire 12, in Phase 9. As shown in FIG. 7, the power supply unit 10 generates the voltage of 0 V at the fourth terminal T4 and supplies the voltage of 0 V to the second piezoelectric elements 72 of the driving members 32 of the second set shown in FIG. 6B via the fourth wire 14, in Phase 9.

As shown in FIG. 10(b), in Phase 9, the deformation of the first piezoelectric elements 62 driving the driving members 32 of the second set in the Y direction is maintained and the contact of the tip portions 32a with the rotor 4 is maintained (see Phase 9 in FIG. 11(b)). In this state, as shown in FIG. 10(b), the second piezoelectric elements 72 are returned to the original shape in Phase 9. Accordingly, the tip portions 32a are moved in the positive X2 axis direction relative to the base portions 32b and the base member 2 (see Phase 9 in FIG. 11(d)). The movement of the tip portions 32a at this time is proportional to the absolute value of the voltage supplied to the second piezoelectric elements 72 in Phase 8.

That is, in Phase 9, the tip portions 31a of the driving members 31 of the first set are moved in the negative Y axis direction and are moved in the negative X1 axis direction which is opposite to the rotational direction R of the rotor 4 while maintaining the separation from the rotor 4, as shown in FIG. 10(a). At the same time, as shown in FIG. 10(b), the tip portions 32a of the driving members 32 of the second set maintain the contact with the rotor 4, are moved in the positive X1 axis direction along the rotational direction R of the rotor 4 while supporting the rotor 4, and thus drive the rotor 4 in the rotational direction R.

(Phase 10)

As shown in FIG. 7, the power supply unit 10 maintains the voltage of −1.0 V at the first terminal T1 and maintains the voltage supplied to the first piezoelectric elements 61 of the driving members 31 of the first set shown in FIG. 6A via the first wire 11, in Phase 10. As shown in FIG. 7, the power supply unit 10 generates the voltage of −3.0 V at the third terminal T3 and supplies the voltage to the second piezoelectric elements 71 of the driving members 31 of the first set shown in FIG. 6B via the third wire 13, in Phase 10.

As shown in FIG. 10(a), in Phase 10, the deformation of the first piezoelectric elements 61 driving the driving members 31 of the first set in the Y direction is maintained and the separation of the tip portions 31a from the rotor 4 is maintained (see Phase 10 in FIG. 11(a)). In this state, as shown in FIG. 10(a), the second piezoelectric elements 71 are deformed in the thickness-shear mode in Phase 10. Accordingly, the tip portions 31a are moved in the negative X1 axis direction relative to the base portions 31b and the base member 2 (see Phase 10 in FIG. 11(c)). The movement of the tip portions 31a at this time is proportional to the absolute value of the voltage supplied to the second piezoelectric elements 71.

As shown in FIG. 7, the power supply unit 10 maintains the voltage of 1.0 V at the second terminal T2 and maintains the voltage supplied to the first piezoelectric elements 62 of the driving members 32 of the second set shown in FIG. 6A via the second wire 12, in Phase 10. As shown in FIG. 7, the power supply unit 10 generates the voltage of 1.0 V at the fourth terminal T4 and supplies the voltage to the second piezoelectric elements 72 of the driving members 32 of the second set shown in FIG. 6B via the fourth wire 14, in Phase 10.

As shown in FIG. 10(b), in Phase 10, the deformation of the first piezoelectric elements 62 driving the driving members 32 of the second set in the Y direction is maintained and the contact of the tip portions 3a with the rotor 4 is maintained (see Phase 10 in FIG. 11(b)). In this state, as shown in FIG. 10(b), the second piezoelectric elements 72 are deformed in the thickness-shear mode in Phase 10. Accordingly, the tip portions 32a are moved in the positive X2 axis direction relative to the base portions 32b and the base member 2 (see Phase 10 in FIG. 11(d)). The movement at this time is proportional to the absolute value of the voltage newly supplied in Phase 10.

That is, in Phase 10, the tip portions 31a of the driving members 31 of the first set are further moved in the negative X1 axis direction relative to the base portions 31b and the base member 2 while maintaining the separation from the rotor 4, as shown in FIG. 10(a). At the same time, as shown in FIG. 10(b), the tip portions 32a of the driving members 32 of the second set maintain the contact with the rotor 4, are moved in the positive X2 axis direction along the rotational direction R of the rotor 4 while supporting the rotor 4, and thus drive the rotor 4 in the rotational direction R.

In Phase 11 and the phases subsequent thereto, the same operations as described in Phase 3 to Phase 10 are repeatedly performed and the rotor 4 thus continues to rotate. Accordingly, the rotor 4 is alternately (sequentially) subjected to the support in the Y axis direction and the driving in the rotational direction R by the tip portions 31a of the driving members 31 of the first set and the tip portions 32a of the driving members 32 of the second set and the rotor 4 thus continues to rotate about the support shaft 5.

In the piezoelectric actuator 1 according to this embodiment, the first piezoelectric elements 6 driving the driving members 3 in the direction (the first direction) parallel to the support shaft 5 and the second piezoelectric elements 7 driving the tip portions 3a of the driving members 3 in the width w3 direction (the second direction) of the driving members 3 along the rotational direction R of the rotor 4 are independently disposed. Accordingly, the vibrations in the directions can be picked up as independent vibrations.

Therefore, when the rotor 4 is made to rotate by the driving members 3 and the rotor 4 and the driving members 3 are relatively driven, the rotor 4 can be made to rotate stably. Compared with the case where the first piezoelectric elements 6 interposing the base portions 3b drive the base portions 3b in different directions, it is difficult to cause the loss and it is possible to improve the energy efficiency, thereby increasing the output power of the piezoelectric actuator 1.

The first piezoelectric elements 6 interpose base portion 3b of each driving member 3 in the width w3 direction and the first piezoelectric elements 6 drive the corresponding driving member 3 in the direction parallel to the support shaft 5 and different from the width w3 direction. The sizes and shapes of the pair of first piezoelectric elements 6 and 6 interposing the base portion 3b are substantially the same. Accordingly, it is possible to unify the rigidity of the driving members 3 in the width w3 direction. As a result, it is possible to suppress the vibration of the base portions 3b of the driving members 3 in the width w3 direction. By setting all the first piezoelectric elements 6 and the second piezoelectric elements 7 to the same shape and size, it is possible to facilitate the manufacturing thereof and thus to improve the productivity.

The base member 2 includes the holding portions 2a holding the driving members 3 so as to be driven in the direction parallel to the support shaft 5. Each holding portion 2a includes the support faces 2f supporting the base portion 3b of the corresponding driving member 3 in the width w3 direction of the driving member 3. Accordingly, it is possible to support the first piezoelectric elements 6 by the use of the support faces 2f and thus to support the base portion 3b of the corresponding driving member 3 in the width w3 direction with the first piezoelectric elements 6 interposed therebetween. As a result, it is possible to enhance the rigidity of the driving members 3 in the width w3 direction and thus to suppress the vibration of the base portions 3b of the driving members 3 in the width w3 direction.

Here, each first piezoelectric element 6 has an elastic modulus in the thickness direction (longitudinal elastic modulus) greater than an elastic modulus in the deformation direction (transverse elastic modulus). Each second piezoelectric element 7 has an elastic modulus in the thickness direction (longitudinal elastic modulus) greater than an elastic modulus in the deformation direction (transverse elastic modulus). Accordingly, it is possible to enhance the rigidity of the driving members 3 in the width w3 direction and to lower the rigidity of the base portions 3b in the driving direction. As a result, it is possible to prevent any movement of the base portions 3b in the width w3 direction, thereby suppressing the vibration. It is possible to facilitate the displacement of the base portions 3b in the driving direction.

Here, each driving member 3 in this embodiment includes the tilted faces S2 and S3 disposed in the corresponding tip portion 3a and has such a tapered shape that the sectional area of the tip portion 3a parallel to the contact face S1 becomes smaller as it goes closer to the rotor 4. Accordingly, when the contact face S1 is grinded or when the contact face S1 is worn way with the lapse of time, it is possible to suppress the decrease in volume of the driving member 3, compared with the case where the tilted faces S2 and S3 are not provided. As a result, it is possible to minimize the decrease in mass of the driving member 3 and thus to reduce the variation of the natural frequency of the support and drive section 1a to a negligible extent. Therefore, it is possible to continuously drive the support and drive section 1a in the resonant state and thus to maintain the high output power of the piezoelectric actuator 1 for a long time.

As shown in FIGS. 5A and 5B, the support faces 2f of each holding portion 2a are tilted in the direction parallel to the support shaft 5 in the driving member 3 and the width w4 between the support faces 2f and 2f becomes smaller as it gets further separated from the rotor 4 and gets closer to the bottom 2g of the holding portion 2a. The width w4' between the support faces 2f and 2f becomes smaller than the width w5 between the base portion 3b of the driving member 3 and the pair of first piezoelectric elements 6 on the side closer to the rotor 4 than the bottom 2g.

Accordingly, when the base portion 3b of each driving member 3 and the first piezoelectric elements 6 and 6 interposing the base portion are inserted to the bottom 2g of the holding portion 2a from the rotor 4 side in the direction parallel to the support shaft 5, the base portion 3b and the first piezoelectric elements 6 are interposed and supported by the support faces 2f in the width w4 direction midway in the support faces 2f. As a result, it is possible to position the driving member 3 in the direction parallel to the support shaft 5. Since the support faces 2f do not regulate the driving of the driving member 3 toward the rotor 4, it is possible to maintain the driving member 3 drivable toward the rotor 4.

The side surfaces 3c of the base portion 3b of the driving member 3 facing the support faces 2f are tilted similarly to the support faces 2f and are substantially parallel to the support faces 2f. Accordingly, when the base portion 3b of each driving member 3 and the first piezoelectric elements 6 interposing the base portion 3b are inserted toward the bottom 2g of the corresponding holding portion 2a from the rotor 4 side in the direction parallel to the support shaft 5, it is possible to bring the first piezoelectric elements 6 into close contact with the support faces 2f of the holding portion 2a and to press the first piezoelectric elements 6 to the support faces 2f. As a result, it is possible to suppress the vibration of the base portions 3b of the driving members 3 in the width w3 direction.

Since the tilt angle α of each support face 2f about the direction parallel to the support shaft 5 is in the range of 2° to 6°, it is possible to set the positioning error of the driving members 3 in the direction parallel to the support shaft 5 to an allowable error range. Here, when the tilt angle α is smaller than 2°, the positioning precision is lowered and the manufacturing becomes difficult. When the tilt angle α is greater than 6°, the driving of the driving members 3 in the direction parallel to the support shaft 5 is adversely influenced. In this embodiment, it is possible to improve the positioning precision, the productivity, and the drivability by setting the tilt angle α to 4°.

At the neutral position where the driving member 3 is positioned by the support faces 2f of the corresponding holding portion 2a, the bottom surface 3d of the base portion 3b of the driving member 3 is separated from the bottom 2g of the holding portion 2a in the direction parallel to the support shaft 5, which is the driving direction of the base portion 3b of the driving member 3. Accordingly, it is possible to drive the driving member 3 from the neutral position toward the base member 2. In this embodiment, even when the driving member 3 is driven from the neutral position toward the base member 2, the bottom surface 3d of the base portion 3b is separated from the bottom 2g of the holding portion 2a. Accordingly, when the driving member 3 is driven toward the base member 2, it is possible to prevent the bottom surface 3d of the base portion 3b from colliding with the bottom 2g of the holding portion 2a and thus to prevent any adverse influence on the driving of the driving member 3 due to the collision.

Each driving member 3 includes the tip portion 3a supporting and driving the rotor 4 in the rotational direction R and the base portion 3b held by the corresponding holding portion 2a of the base member 2 in the state where it is interposed between the pair of first piezoelectric elements 6. The driving member 3 further includes the second piezoelectric elements 7 driving the tip portion 3a in the width w3 direction of the holding portion 2a and the driving member 3 along the rotational direction R of the rotor 4 between the tip portion 3a and the base portion 3b.

Accordingly, by driving the driving member 3 in the width w3 direction, a frictional force in the tangential direction of the rotational direction R acts between the bottom surface of the rotor 4 and the tip portion 3a of the driving member 3, thereby driving the rotor 4 in the rotational direction R. It is possible to independently control the first piezoelectric elements 6 and the second piezoelectric elements 7. As a result, it is possible to independently control the driving of the tip portion 3a of the driving member 3 in the direction parallel to the support shaft 5 and the driving in the rotational direction R of the rotor 4.

By simultaneously activating the first piezoelectric elements 6 and the second piezoelectric elements 7, it is possible to simultaneously perform the driving of the tip portion 3a of the driving member 3 in the direction parallel to the support shaft 5 and the driving in the direction along the rotational direction R of the rotor 4.

As a result, as shown in FIGS. 8 to 10, by moving the tip portions 3a of the driving members 3 in the rotational direction R of the rotor 4 at the time of brining the rotor 4 and the tip portions 3a into contact with each other and separating them from each other, it is possible to hand over the rotor 4 from the driving members 31 of the first set to the driving members 32 of the second set without interfering with the rotation of the rotor 4.

Two sets of the first set and the second set are provided, each of which includes three driving members 3 and three by two pairs of first piezoelectric elements 6 and 6 interposing the base portion 3b thereof. Accordingly, it is possible to drive the sets at different times. It is possible to support the rotor 4 at three points by the use of the tip portions 31a and 32a of the driving members 31 and 32 of the sets. As a result, it is possible to more stably support the rotor 4, compared with the support at two points or the support at four or more points.

The driving members 31 and 32 of each set are uniformly arranged in the rotational direction R of the rotor 4 and the driving members 31 of the first set and the driving members 32 of the second set are alternately and sequentially arranged in the rotational direction R. Accordingly, it is possible to support the rotor 4 with a good balance by the use of the driving members 31 and 32 of the sets and to efficiently driving the rotor 4 in the rotational direction R.

The direction in which the tip portion 3a of each driving member 3 is driven is the same as the direction in which the base portion 3b of the driving member 3 is interposed by the first piezoelectric elements 6 and the support faces 2f of the corresponding holding portion 2a. Accordingly, when the tip portion 3a of the driving member 3 performs the transfer driving and the return driving, it is possible to support the base portion 3b of the driving member 3 from before and after the driving direction. As a result, it is possible to suppress the driving member 3 from departing from the direction parallel to the support shaft 5 and to prevent the driving of the rotor 4 from being adversely influenced.

By allowing the power supply unit 10 to supply the voltages having a phase difference to the driving members 31 and 32 of the first and second sets, it is possible to drive the rotor 4 by the use of the driving members 31 and 32 of the respective sets.

By setting the voltages supplied from the power supply unit 10 to the first piezoelectric elements 6 and the second piezoelectric elements 7 of the sets to 180°, it is possible to alternately and sequentially drive the rotor 4 by the use of the driving members 31 of the first set and the driving members 32 of the second set.

By allowing the power supply unit 10 to supply the voltages to the first piezoelectric elements 6 and the second piezoelectric elements 7 of the sets so as to sequentially repeat the contact of the tip portions 3a of the driving member 3 with the rotor 4, the transfer in the width w3 direction of the driving members 3, the separation from the rotor 4, and the return in the width w3 direction of the driving members 3, it is possible to continuously perform the rotational driving of the rotor 4.

As shown in Phases 3, 7, and 14 of FIG. 7, the power supply unit 10 overlaps the voltage supplied to the second terminal T2 with the voltage supplied to the first terminal T1. Accordingly, it is possible to continuously and smoothly hand over the rotor 4 from the driving members 31 of the first set to the driving members 32 of the second set.

As shown in FIG. 7, the power supply unit 10 sets the increasing rate (slope) of the voltage supplied to the third terminal T3 and the fourth terminal T4 when the tip portions 3a of the driving members 3 performs the transfer driving in the width w3 direction and the decreasing rate (slope) of the voltage when the tip portions perform the return driving to be different from each other. For example, at the third terminal T3, the voltage is increased by 1.0 V in the phases of Phase 2 to Phase 8 in which the tip portions 3a are made to perform the transfer driving, and the voltage is decreased by 3.0 V in the phases from Phase 9 to Phase 10 in which the tip portions 3a are made to perform the return driving. Accordingly, the transfer driving time of the tip portions 3a of the driving members 3 can be set to be longer than the return driving time, thereby elongating the contact time of the tip portions 3a of the driving members 3 with the rotor 4. As a result, it is possible to transmit the power of the driving members 3 to the rotor 4 with high efficiency.

The frequency of the voltages supplied to the first piezoelectric elements 6 and the second piezoelectric elements 7 from the power supply unit 10 is substantially the same as the frequency of the resonant vibration of the support and drive section 1a including the first piezoelectric elements 6, the second piezoelectric elements 7, the driving members 3, and the base member 2. Accordingly, it is possible to enhance the amplitude of the transfer driving and the return driving of the rotor 4 by the use of the tip portions 3a of the driving members 3. The frequency of the resonant vibration of the support and drive section 1a can be adjusted by properly selecting the materials of the base member 2, the piezoelectric elements, and the tip portions 3a and the base portions 3b of the driving members 3.

In this embodiment, as shown in FIG. 7, the period of the voltages supplied to the first piezoelectric elements 61 and 62 of the driving members 31 and 32 of the sets from the first terminal T1 and the second terminal T2 is the same as the period of the voltages supplied to the second piezoelectric elements 71 and 72 of the sets from the third terminal T3 and the fourth terminal T4. Accordingly, the frequency of the driving of the driving members 31 and 32 in the direction parallel to the support shaft 5 is the same as the frequency of the driving of the tip portions 31a and 32a in the width w31 and w32 directions of the driving members 31 and 32. As a result, it is possible to maximize the amplitude of the driving members 31 and 32 in the direction parallel to the support shaft 5 and the amplitude of the tip portions 31a and 32a in the width w31 and w32 directions of the driving members 31 and 32.

The tip portion 3a of each driving member 3 has such a tapered shape that the sectional area along the rotational direction R of the rotor 4 becomes smaller as it gets closer to the rotor 4. Accordingly, compared with the case where the tip portion 3a is formed in a rectangular parallelepiped shape, it is possible to reduce the contact area of the tip portion 3a with the rotor 4, thereby reducing the volume variation of the tip portion 3a due to the abrasion of the tip portion 3a. As a result, it is possible to reduce the variation in weight of the tip portion 3a due to the abrasion of the tip portion 3a, thereby reducing the variation in the resonance frequency of the driving member 3. By setting the shape of the tip portion 3a to a hexagonal prism, it is possible to enhance the rigidity of the tip portion 3a, compared with the other shapes.

The groove 2d is formed in the side surface 2c of the base member 2 which is substantially parallel to the support shaft 5 and which intersects the width w3 direction of the driving members 3 substantially perpendicularly thereto. That is, the groove 2d is disposed to substantially perpendicularly intersect the vibration in the direction substantially parallel to the support shaft 5 propagating through the base member 2. Accordingly, it is possible to absorb the vibration by the use of the groove 2d, thereby reducing the propagation of the vibration in the base member 2.

The first piezoelectric elements 6 are disposed between the rotor 4 and the groove 2d. Accordingly, it is possible to reduce the vibration propagating over the groove 2d from the opposite side of the base member 2 about the rotor 4.

The end of the base member 2 opposite to the holding portions 2a holding the driving members 3 is fixed to the attaching section 101a and the groove 2d is disposed at a position closer to the attaching section 101a than the driving members 3. Accordingly, even when the vibration of the attaching section 101a propagates to the base member 2, it is possible to reduce the vibration at the position relatively apart from the driving members 3, thereby preventing the adverse influence of the vibration of the attaching section 101a on the driving of the driving members 3.

The width w1 of the groove 2d in the direction parallel to the support shaft 5 is set to be greater than the amplitude of the vibration of the base member 2. Accordingly, it is possible prevent the portions of the base member 2 on both sides of the groove 2d from colliding with each other.

The width w1 of the grooved 2d in the direction parallel to the support shaft 5 is set to be greater than the amplitude of the resonant vibration of the support and drive section 1a including the base member 2, the driving members 3, the first piezoelectric elements 6, and the second piezoelectric elements 7. Accordingly, even when the support and drive section 1a vibrates in the resonant state, it is possible to prevent the portions of the base member 2 on both sides of the groove 2d from colliding with each other.

By setting the depth d1 of the groove 2d to the range of 40% to 80% of the radius of the base member 2, it is possible to satisfactorily suppress the propagation of the vibration while satisfactorily guaranteeing the strength of the base member 2.

Since the clearance 2e is formed between the base member 2 and the support shaft 5, it is possible to reduce any vibration propagating from the base member 2 to the support shaft 5. It is also possible to reduce any vibration propagating from the support shaft 5 to the base member 2. Accordingly, it is possible to prevent any adverse influence on the driving of the driving members 3 and the rotor 4.

An interchangeable lens will be described below as an example of a lens barrel including the piezoelectric actuator 1 according to this embodiment. The interchangeable lens according to this embodiment constitutes a camera system along with a camera body not shown and is detachably attached to the camera body. The interchangeable lens can be switched between an AF mode where a focusing operation is carried out under a known AF (Auto Focus) control and an MF (Manual Focus) mode where the focusing operation is carried out in response to a user's manual input.

Figure 12:
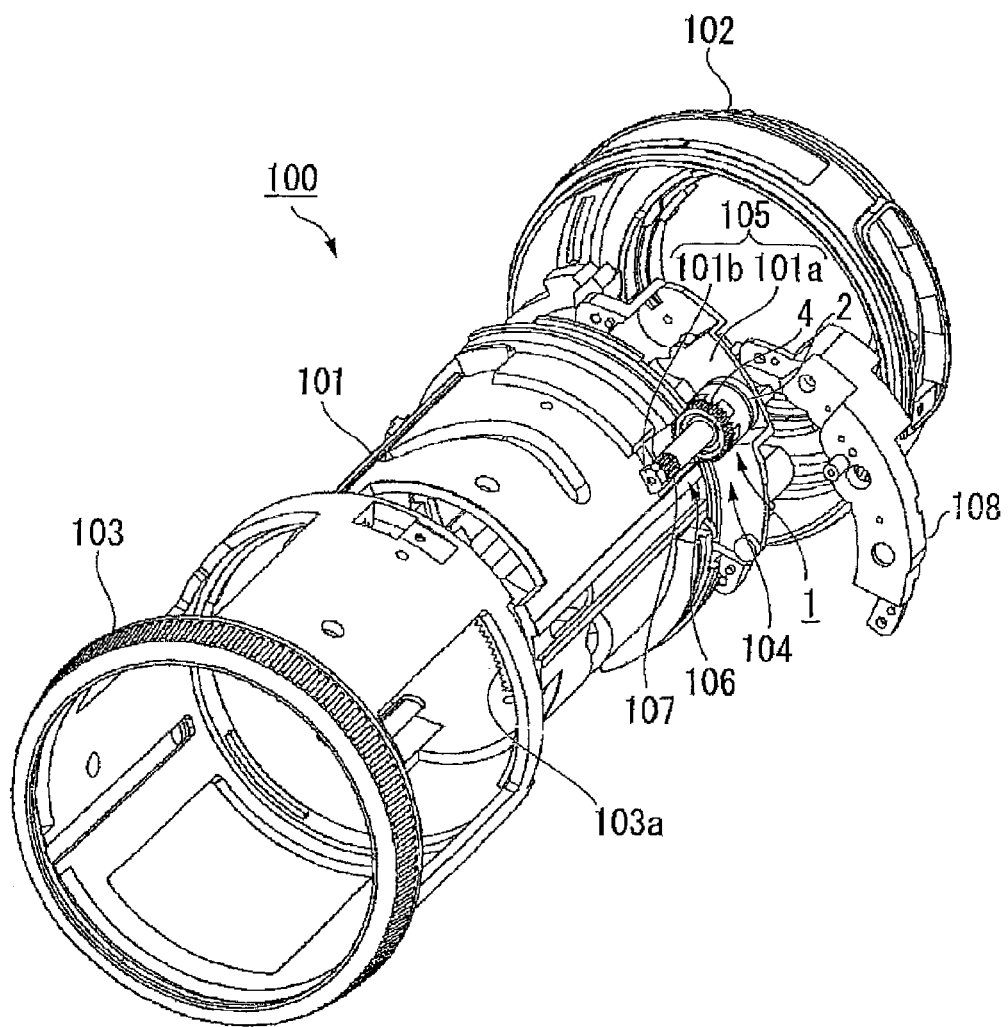
FIG. 12 is an exploded perspective view illustrating a lens barrel including the piezoelectric actuator.

FIG. 12 is an exploded perspective view illustrating the interchangeable lens 100 according to this embodiment.

As shown in FIG. 12, the interchangeable lens 100 includes a fixed barrel 101, an external barrel 102, a focusing barrel 103, and a driving unit 104. Although not shown in FIG. 12, three lens groups received in a lens group chamber and a holding barrel are disposed inside the fixed barrel 101. The lens groups include three lens groups of a pair of lens groups used in a zooming operation and a lens group disposed therebetween and used in the focusing operation.

The driving unit 104 is a unit that rotates the focusing barrel 103 about an optical axis in response to a signal from an AF controller not shown at the time of performing the AF control.

The driving unit 104 includes a support section 105, a piezoelectric actuator 1, a focus barrel gear 103a, and a cover 108.

The support section 105 is a section that supports the piezoelectric actuator 1 relative to the fixed barrel 101. The support section 105 includes an attaching section 101a and a bearing section 101b.

The attaching section 101a supports one end of the piezoelectric actuator 1. The attaching section 101a is a section formed in a needle shape to protrude from a part of the outer circumferential surface of the fixed barrel 101 in the outer diameter direction and forms a body along with the fixed barrel 101.

Similarly to the attaching section 101a, the bearing section 101b protrudes from a part of the outer circumferential surface of the fixed barrel 101 in the outer diameter direction, forms a body along with the fixed barrel 101, and serves to support the other end of a rotation shaft 106 of which one end is fixed to the rotor 4 of the piezoelectric actuator 1.

In the piezoelectric actuator 1, an end of the base member 2 is fixed to the attaching section 101a.

An output gear 107 is disposed at one end of the rotation shaft 106 and the other end thereof is fixed to the rotor 4. The rotation shaft 106 is independently disposed on the same axis as the support shaft 5 (see FIG. 2) of the piezoelectric actuator 1. The output gear 107 engages with the focusing barrel gear 103a disposed in the focusing barrel 103.

The cover 108 serves to protect the piezoelectric actuator 1 and is fixed to the fixed barrel 101 by the use of screws not shown.

The interchangeable lens 100 is detachably attached to the camera body with the external barrel 102 interposed therebetween.

In the AF mode of the interchangeable lens 100, the power supply unit 10 of the piezoelectric actuator 1 operates, for example, in response to a signal from the AF controller disposed in the camera body and the rotor 4 of the piezoelectric actuator 1 rotates. The rotation shaft 106 rotates with the rotation of the rotor 4 and the focusing barrel 103 rotates about the optical axis with the rotation thereof. The focusing barrel 103 causes the lens groups used in the focusing operation to go forward and backward in the optical axis direction via the focusing cam mechanism not shown with the rotation thereof. In this way, the interchangeable lens 100 performs the AF operation.

On the other hand, in the MF mode, the focusing barrel 103 is manually made to rotate about the optical axis by the user. Similarly to the AF mode, the focusing barrel 103 causes the lens group used in the focusing operation to go forward and backward with the rotation thereof. In this way, the interchangeable lens 100 performs the MF operation.

As described above, in the interchangeable lens 100 according to this embodiment, since the piezoelectric actuator 1 which can pick up the vibrations in two different directions as independent vibrations and enhance the output power is provided, it is possible to reduce the power consumption in the AF mode.

It is possible to transmit the power of the piezoelectric actuator 1 directly to the focusing barrel 103 without using an intermediate gear or a final gear. Accordingly, it is possible to reduce any energy loss and to save energy. It is also possible to reduce the number of components.

This embodiment can be modified in various forms. For example, the base member can be divided into plural parts as long as they are disposed to surround the support shaft, or can not completely surround the support shaft. For example, the base member can be half-sided on the circumference surrounding the support shaft or can be disposed to interpose the support shaft from both sides.

In the above-mentioned embodiment, it has been described that a pair of first piezoelectric elements driving each driving member in the direction parallel to the support shaft is disposed to interpose the driving member. Instead, the first piezoelectric elements can be disposed on only one side surface of the driving member. By using a piezoelectric element which is displaced in the thickness direction as the first piezoelectric element, the first piezoelectric elements can be disposed between the bottoms of the holding portions of the base member and the bottom surfaces of the base portions of the driving members. In this case, the base portions are directly supported by the support faces of the holding portions formed in the base member from both ends in the width direction of the holding portions along the rotational direction of the rotor without using the piezoelectric elements. The support faces can serve as a guide portion holding the base portion to be slidable in the direction parallel to the support shaft.

Although it has been described in the above-mentioned embodiment that two sets of the driving members including the first piezoelectric elements and the second piezoelectric elements are provided, the number of sets of the driving members can be three or more. The number of driving members included in each set of driving members can be 1, or 2, 4, or more. For example, in the above-mentioned embodiment, three sets of driving members, each of which includes two driving members disposed on the diagonal of the base member, can be configured. In this case, the phase difference between the voltages of the voltages can be set to, for example, 120 degrees. Accordingly, it is possible to normally support and rotate the rotor by the use of two sets of driving members. The phase difference between the voltages of the sets of driving members can be set to a value obtained by dividing 360 degrees by the number of sets (that is, 180 degrees in case of two sets and 120 degrees in case of three sets).

Although it has been described in the above-mentioned embodiment that the direction (the second direction) in which the first piezoelectric elements interpose the base portion of the corresponding driving member is the same as the direction (the third direction) in which the second piezoelectric elements drive the tip portion of the corresponding driving member, the directions can be set to be different from each other. For example, by setting the third direction to a direction intersecting the width w3 direction of the driving member and being parallel to the rotational direction of the rotor, the rotor can be made to easily rotate.

Figure 13A:
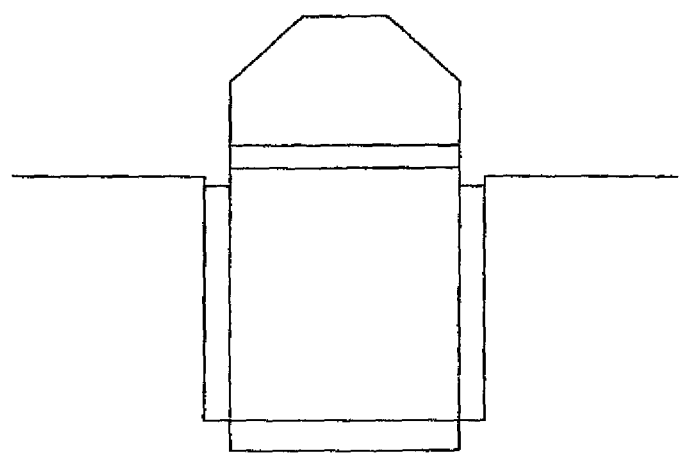
FIG. 13A is a front view illustrating a holding portion and a driving member of a piezoelectric actuator according to a modification.
Figure 13B:
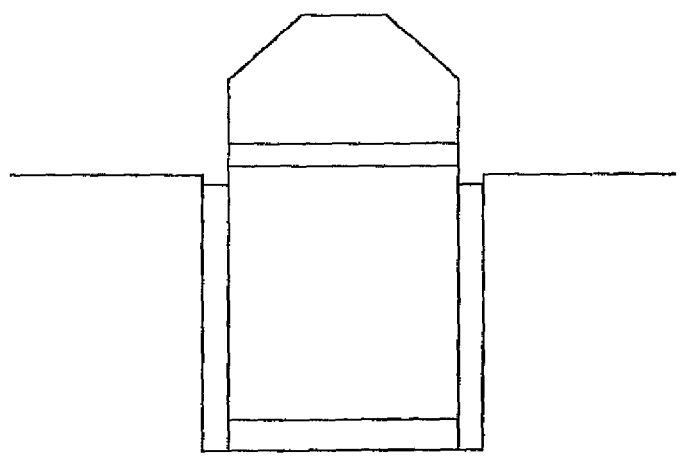
FIG. 13B is a front view illustrating a holding portion and a driving member of a piezoelectric actuator according to another modification.

The support faces of the base member can not be tilted in the direction (the first direction) parallel to the support shaft. For example, as shown in FIG. 13A, a locking portion having a protrusion shape locking the ends of the first piezoelectric elements close to the bottom of the holding portion can be provided to the holding portion. As shown in FIG. 13B, the positioning can be performed by allowing the ends of the first piezoelectric elements close to the bottom of the holding portion to protrude from the bottom surface of the base portion and to serve as a positioning portion and allowing the positioning portion to collide with the bottom of the holding portion.

The clearance between the base member and the support shaft can be formed up to the edge of the groove close to the holding portion, from the viewpoint of guaranteeing the strength of the base member.

The voltages supplied to the first piezoelectric elements and the second piezoelectric elements from the terminals of the power supply unit can be set to a sinusoidal voltage waveform or a voltage waveform similar to the sinusoidal waveform.

First, similarly to the above-mentioned embodiment, an example where the sets of driving members include two sets of a first set and a second set, the phase difference between the sinusoidal voltage waveforms generated at the first terminal and the second terminal of the power supply unit is 180°, and the phase difference between the sinusoidal voltage waveforms generated at the third terminal and the fourth terminal is 180° will be described below with reference to FIG. 14.

Similarly to FIG. 11 (a)-(d), FIG. 14(a) shows the displacement of the tip portions of the driving members of the first set in the Y direction and FIG. 14(b) shows the displacement of the driving members of the second set in the Y direction. FIG. 14(c) shows the displacement of the driving members of the first set in the X1 direction and FIG. 14(d) shows the displacement of the second set in the X2 direction (see FIGS. 8 to 10).

When the phase difference between the sinusoidal voltage waveforms generated at the first terminal and the second terminal of the power supply unit is 180°, the tip portions of the driving members of the first set and the second set driven in the Y axis direction drawn a sinusoidal track having a phase difference of 180°, as shown in parts (a) and (b) of FIG. 14. At this time, the tip portions of the driving members of the first set come in contact with the rotor when the displacement in the Y axis direction goes over the contact position y1, as indicated by a bold line in FIG. 14(a) (see FIGS. 8 to 10). As indicated by a bold line in FIG. 14(b), the tip portions of the driving members of the second set come in contact with the rotor similarly.

Here, the track of the driving members of the first set shown in FIG. 14(a) and the track of the driving members of the second set shown in FIG. 14(b) have a phase difference of 180°. Accordingly, the tip portions of the driving members of the first set and the tip portions of the driving members of the second set alternately come in contact with the rotor and support the rotor (see FIGS. 8 to 10). At this time, similarly to the above-mentioned embodiment, a period in which the tip portions of the driving members of both sets are separated from the rotor exists. However, similarly to the above-mentioned embodiment, the rotor is hardly displaced in the Y direction due to the inertia thereof in the meantime.

Similarly, when the phase difference between the sinusoidal voltage waveforms generated at the second terminal and the third terminal of the power supply unit is 180°, the tip portions of the driving members of the first set and the second set driving the rotor in the X1 axis direction and the X2 axis direction draw a sinusoidal track (see FIGS. 8 to 10), as shown in parts (c) and (d) of FIG. 14.

Here, as indicated by a bold line in FIG. 14(c), the tip portions of the driving members of the first set are moved in the positive X1 axis direction along the rotational direction of the rotor while they are in contact with the rotor (during the time indicated by the bold lines in FIG. 14(a)) (see FIGS. 8 to 10). As indicated by a bold line in FIG. 14(d), the tip portions of the driving members of the second set are similarly moved in the positive X2 direction along the rotational direction of the rotor while they are in contact with the rotor (during the time between the bold lines in FIG. 14(b)).

Accordingly, similarly to the above-mentioned embodiment, the rotor is driven in the rotational direction alternately by the driving members of the first set and the driving members of the second set (see FIGS. 8 to 10).

An example where the sets of driving members include three sets of first to third sets and sinusoidal voltage waveforms or voltage waveforms similar to the sinusoidal waveform having a phase difference of 120° are generated at the terminals of the power supply unit will be described below with reference to FIG. 15. In this case, the power supply unit includes a fifth terminal and a sixth terminal supplying voltages of the first piezoelectric elements and the second piezoelectric elements of the driving members of the third set in addition to the first to fourth terminals. Similarly to the X1 direction of the driving members of the first set and the X2 direction of the driving members of the second set (see FIGS. 8 to 10), the width direction (the width direction of the holding portions) of the driving members of the third set along the rotational direction of the rotor and perpendicular to the support shaft is defined as an X3 direction.

FIG. 15(a) shows the displacement of the tip portions of the driving members of the first to third sets in the Y direction and FIG. 15(b) shows the displacement of the tip portions of the driving members of the first to third sets in the X1 to X3 directions. In parts (a) and (b) of FIG. 15, the track of the tip portions of the driving members of the first set is indicated by a solid line, the track of the tip portions of the driving members of the second set is indicated by a broken line, and the track of the tip portions of the driving members of the third set is indicated by a one-dotted chained line.

When the voltage waveforms supplied to the first piezoelectric elements of the sets from the power supply unit have a phase difference of 120°, the tip portions of the driving members of the sets driven in the Y axis direction draw sinusoidal tracks having a phase difference of 120°, as shown in FIG. 15(a). At this time, the tip portions of the driving members of the sets come in contact with the rotor, as indicated by the bold line in FIG. 15(a), when the displacement in the Y axis direction goes over the contact position y1 (see FIGS. 8 to 10).

Here, the tracks of the driving members of the sets shown in FIG. 15(a) have the phase differences of 120°. Accordingly, the tip portions of the driving members of the sets sequentially come in contact with the rotor and support the rotor (see FIGS. 8 to 10). At this time, similarly to the above-mentioned embodiment, a period in which the tip portions of the driving members of the sets are separated from the rotor exists. However, similarly to the above-mentioned embodiment, the rotor is hardly displaced in the Y direction due to its inertia in the meantime.

Similarly, when the voltage waveforms supplied to the second piezoelectric elements of the sets from the power supply unit have the phase differences of 120°, the tip portions of the driving members of the sets driven in the X1 to X3 axis directions draw sinusoidal tracks, as shown in FIG. 14(b) (see FIGS. 8 to 10).

Here, as indicated by the bold line in FIG. 15(b), the tip portions of the driving members of the sets are moved in the positive X1 to X3 axis directions along the rotational direction of the rotor while they are in contact with the rotor (the time between the parts indicated by the bold lines in FIG. 15(a)) (see FIGS. 8 to 10).

Accordingly, similarly to the above-mentioned embodiment, the rotor is sequentially driven in the rotational direction by the driving members of the sets (see FIGS. 8 to 10).

In the above-mentioned embodiment, it has been described that the base member 2 is formed in a hollow cylindrical shape out of a metal material such as stainless steel. In another embodiment, all or a part of the base member 2 can be formed of an elastic body having elasticity. That is, at least a part of the base member 2 can have elasticity. In this embodiment, substantially all or at least the convex portions 2h and 2i (see FIG. 4) of the base member 2 can be formed of an elastic body. Here, the configuration of the piezoelectric actuator 1 other than the base member can be the same as described in the above-mentioned embodiment.

In this embodiment, the frequencies of the voltages supplied to the first piezoelectric elements 6 and the second piezoelectric elements 7 from the power supply unit 10 can be set to be substantially the same as the resonance frequency of the support and drive section 1a including the first piezoelectric elements 6, the second piezoelectric elements 7, the driving members 3, and the base member 2. The waveforms of the voltages supplied to the first piezoelectric elements 6 and the second piezoelectric elements 7 from the terminals of the power supply unit 10 can be set to a sinusoidal waveform. Alternatively, when the frequencies of the voltages to be supplied are substantially the same as the resonant frequency of the support and drive section 1a, other waveforms such as a rectangular waveform can be used.

The operation in the case where at least a part of the base member 2 is formed of an elastic body and the waveforms of the voltages to be supplied are sinusoidal will be described below with reference FIG. 16 and FIGS. 17A to 17D.

In FIG. 16 and FIGS. 17A to 17D, a coordinate system in which the direction along the rotational direction R of the rotor 4 is defined as an X4 direction and the direction parallel to the support shaft 5 is defined as the Y direction is used.

In FIG. 16 and FIGS. 17A to 17D, similarly to the above-mentioned embodiment, the sets of driving members include two sets of a first set including the driving members 31 and a second set including the driving members 32, the phase difference between the sinusoidal voltage waveforms generated at the first terminal and the second terminal of the power supply unit 10 is 180°, and the phase difference between the sinusoidal voltage waveforms generated at the third terminal and the fourth terminal is 180°.

As shown in FIG. 4, among six convex portions (protrusions) formed in the base member 2, three convex portions in which the driving members 32 of the second set are located on the advanced side in the rotation direction are defined as first convex portions 2h and three convex portions in which the driving members 31 of the first set are located on the advanced side in the rotational direction are defined as second convex portions 2i. The first convex portions 2h and the second convex portions 2i have elasticity.

In FIG. 16(a), the displacement of the tip portions 31a of the driving members 31 of the first set in the Y direction is indicated by a bold line, the thickness-shear deformation in the Y direction of the first piezoelectric elements 61 interposing the driving members 31 of the first set is indicated by a solid line, and the displacement in the Y direction of the support faces 2f supporting the driving members 31 of the first set is indicated by a broken line.

In FIG. 16(b), the displacement of the tip portions 32a of the driving members 32 of the second set in the Y direction is indicated by a bold line, the thickness-shear deformation in the Y direction of the first piezoelectric elements 62 interposing the driving members 32 of the second set is indicated by a solid line, and the displacement in the Y direction of the support faces 2f supporting the driving members 32 of the second set is indicated by a broken line.

In FIG. 16(c), the displacement of the tip portions 31a of the driving members 31 of the first set in the X4 direction is indicated by a bold line, the thickness-shear deformation in the X4 direction of the second piezoelectric elements 71 disposed in the driving members 31 of the first set is indicated by a solid line, and the displacement in the X4 direction of the support faces 2f supporting the driving members 31 of the first set is indicated by a broken line.

In FIG. 16(d), the displacement of the tip portions 32a of the driving members 32 of the second set in the X4 direction is indicated by a bold line, the thickness-shear deformation in the X4 direction of the second piezoelectric elements 72 disposed in the driving members 32 of the second set is indicated by a solid line, and the displacement in the X4 direction of the support faces 2f supporting the driving members 32 of the second set is indicated by a broken line.

Figure 16:
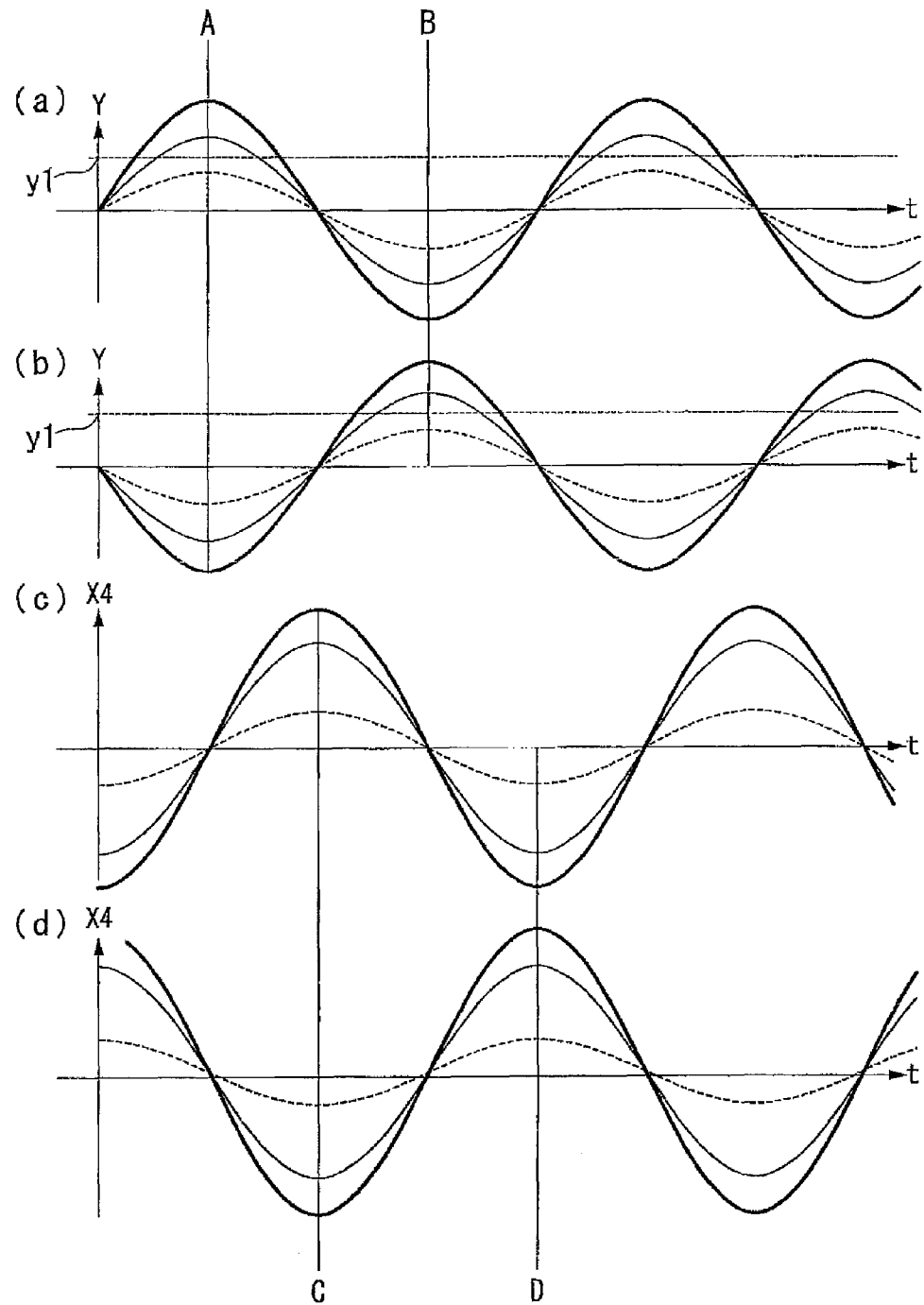
FIG. 16 is a graph illustrating the temporal variation in displacements of the tip portion of the driving member, the support section, and the piezoelectric element in the piezoelectric actuator.

When the phase difference between the sinusoidal voltage waveforms generated at the first terminal and the second terminal of the power supply unit 10 is 180°, the tip portions 3a of the driving members 3 of the first set and the second set driven in the Y axis direction draw sinusoidal tracks having a phase difference of 180°, as shown in parts (a) and (b) of FIG. 16. When the phase difference between the sinusoidal voltage waveforms generated at the third terminal and the fourth terminal of the power supply unit 10 is 180°, the tip portions 3a of the driving members 3 of the first and second sets driven in the X4 axis direction draw sinusoidal tracks having a phase difference of 180°, as shown in parts (c) and (d) of FIG. 16. At this time, due to the vibration of the driving members 3, the base member 2 resonates and at least a part of the base member 2 is elastically deformed. In this embodiment, the support faces 2f disposed in the base member 2 to support the driving members 3 are displaced.

Figure 17A:
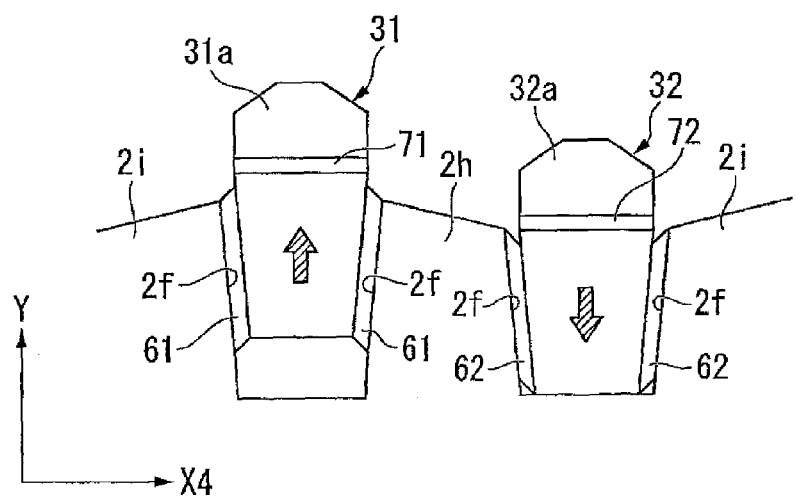
FIG. 17A is a front view illustrating the operations of the driving member and the convex portion of the base member in the piezoelectric actuator.

At point "A" in FIG. 16, the driving members 31 of the first set are displaced positively in the Y direction but the driving members 32 of the second set are displaced negatively in the Y direction. A shearing force is generated in the first convex portions 2h and thus the first convex portions 2h are shear-deformed in the Y direction due to the shearing force, as shown in FIG. 17A. The support faces 2f supporting the driving members 31 of the first set are displaced positively in the Y direction but the support faces 2f supporting the driving members 32 of the second set are displaced negatively in the Y direction.

Figure 17B:
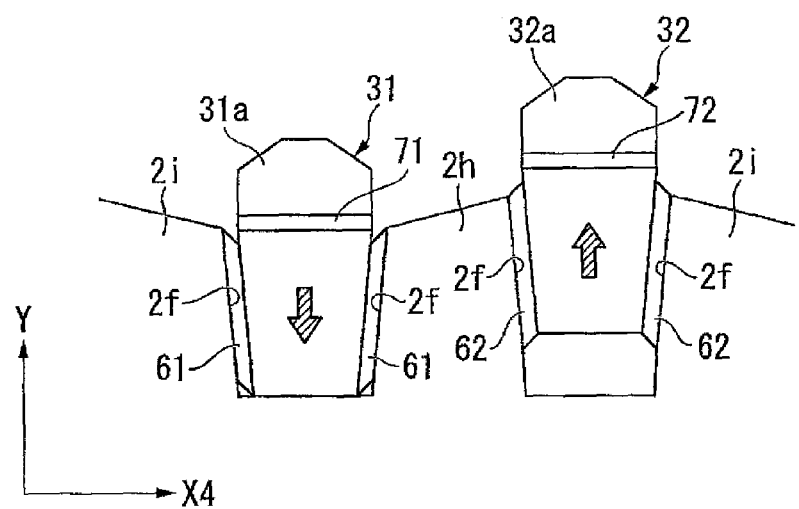
FIG. 17B is a front view illustrating the operations of the driving member and the convex portion of the base member in the piezoelectric actuator.

At point "B" in FIG. 16, the driving members 31 of the first set are displaced negatively in the Y direction but the driving members 32 of the second set are displaced positively in the Y direction. A shearing force is generated in the first convex portions 2h and thus the first convex portions 2h are shear-deformed in the Y direction due to the shearing force, as shown in FIG. 17B. The support faces 2f supporting the driving members 31 of the first set are displaced negatively in the Y direction but the support faces 2f supporting the driving members 32 of the second set are displaced positively in the Y direction.

Figure 17C:
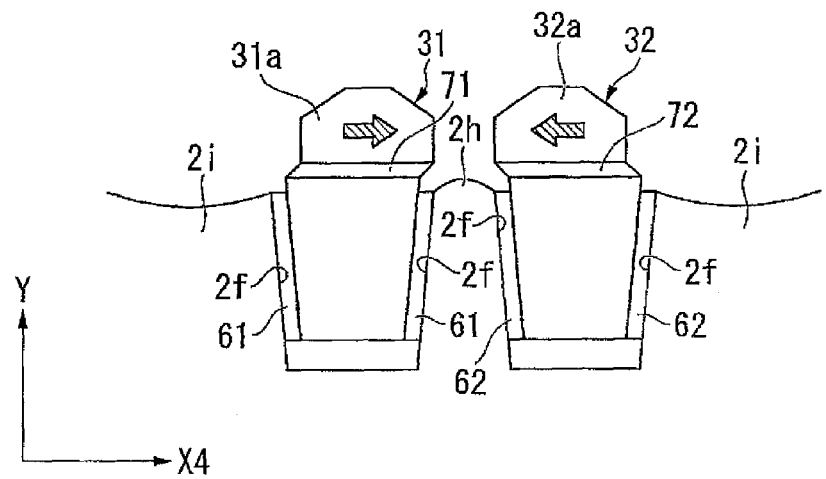
FIG. 17C is a front view illustrating the operations of the driving member and the convex portion of the base member in the piezoelectric actuator.

At point "C" in FIG. 16, the driving members 31 of the first set are displaced positively in the X4 direction but the driving members 32 of the second set are displaced negatively in the X4 direction. A compressive force is generated in the first convex portions 2h and thus the first convex portions 2h are compressive-deformed in the rotational direction of the rotor due to the compressive force, as shown in FIG. 17C. The support faces 2f supporting the driving members 31 of the first set are displaced positively in the X4 direction but the support faces 2f supporting the driving members 32 of the second set are displaced negatively in the X4 direction.

Figure 17D:
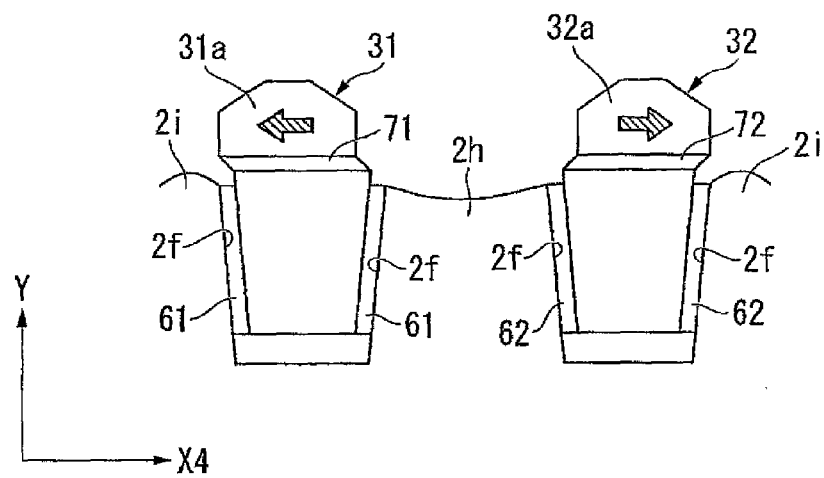
FIG. 17D is a front view illustrating the operations of the driving member and the convex portion of the base member in the piezoelectric actuator.

At point "D" in FIG. 16, the driving members 31 of the first set are displaced negatively in the X4 direction but the driving members 32 of the second set are displaced positively in the X4 direction. A tensile force is generated in the first convex portions 2h and thus the first convex portions 2h are tensile-deformed in the rotational direction of the rotor due to the tensile force, as shown in FIG. 17D. The support faces 2f supporting the driving members 31 of the first set are displaced negatively in the X4 direction but the support faces 2f supporting the driving members 32 of the second set are displaced positively in the X4 direction.

Although the elastic deformation of the first convex portions 2h due to the driving of the first piezoelectric elements 6 and the second piezoelectric elements 7 and the displacement of the support faces 2f based thereon have been described, the second convex portions 2i are similarly deformed with a phase difference of 180° from the first convex portions 2h.

In this embodiment, the support faces 2f are deformed with the same period as the displacement of the driving members due to the elastic deformation of the first convex portions 2h and the second convex portions 2i. The displacement of the tip portions 3a of the driving members 3 is equal to the displacement obtained by adding the displacement based on the thickness-shear deformation of the first piezoelectric elements 6 and the second piezoelectric elements 7 to the displacement of the support faces 2f.

In this embodiment, by using the displacement based on the elastic deformation of the base member 2 in addition to the displacement based on the thickness-shear deformation of the first piezoelectric elements 6 and the second piezoelectric elements 7, the driving members are driven with higher amplitude. Accordingly, it is possible to enhance the output power of the piezoelectric actuator and to lower the voltage necessary for the driving. By causing the support and drive section 1a including the base member 2 to resonate, it is possible to maximally exhibit the advantageous effects using the in-plane deformation and the out-of-plane deformation of the convex portions formed in the base member.

The invention claimed is:

1. A piezoelectric actuator comprising:
a plurality of first piezoelectric elements that are arranged in a direction;
a first member that is arranged between the plurality of first piezoelectric elements and that is driven in a first direction by the plurality of first piezoelectric elements, the first direction intersecting the direction in which the plurality of first piezoelectric elements are arranged;
a second piezoelectric element that is disposed on the first member; and
a second member that is disposed in contact with the second piezoelectric element and that is driven in a second direction by the second piezoelectric element, the second direction intersecting the first direction.

2. The piezoelectric actuator according to claim 1, further comprising a third member that comes in contact with the second member and that is moved relative to the first member by driving the second member.

3. The piezoelectric actuator according to claim 2, further comprising a fourth member that has two faces coming in contact with respective faces of the plurality of first piezoelectric elements and that supports the first member with the plurality of first piezoelectric elements interposed therebetween.

4. The piezoelectric actuator according to claim 3, wherein the fourth member includes an elastic body.

5. The piezoelectric actuator according to claim 2, wherein a plurality of sets, each including the plurality of first piezoelectric elements, the second piezoelectric element, the first member, and the second member, are provided.

6. The piezoelectric actuator according to claim 5, further comprising a power supply unit that supplies voltages to the first piezoelectric elements and the second piezoelectric elements,
wherein the power supply unit supplies the voltages having a phase difference to the sets.

7. The piezoelectric actuator according to claim 6, wherein the power supply unit supplies the voltages so that the second members of the sets repeat (i) a contact with the third member, (ii) a transfer in the second direction, (iii) a separation from the third member, and (iv) a return in the second direction.

8. The piezoelectric actuator according to claim 6, wherein each of the sets includes a fourth member that has two faces coming in contact with respective faces of the plurality of first piezoelectric elements and that supports the first member with the plurality of first piezoelectric elements interposed therebetween, and wherein a frequency of the voltages is the same as a resonance frequency of a structure including the fourth member, the first member, the second member, the first piezoelectric elements, and the second piezoelectric elements.

9. The piezoelectric actuator according to claim 6, wherein the phase difference is 360°/N (where N represents the number of the sets).

10. The piezoelectric actuator according to claim 5, wherein each set includes three pairs of the first piezoelectric elements, three of the second piezoelectric elements, three of the first members, and three of the second members.

11. The piezoelectric actuator according to claim 2, wherein the third member is disposed to be rotatable about a rotation axis parallel to the first direction, and
wherein the second direction is a direction parallel to a rotational direction of the third member.

12. The piezoelectric actuator according to claim 11, wherein a plurality of sets, each including the plurality of first piezoelectric elements, the second piezoelectric element, the first member, and the second member, are provided,
wherein the first members of each set are arranged uniformly in the rotational direction, and
wherein the first members of the different sets are alternately arranged in the rotational direction.

13. The piezoelectric actuator according to claim 2, wherein the second member is formed in a tapered shape such that a sectional area along the second direction decreases as the sectional area approaches the third member.

14. The piezoelectric actuator according to claim 1, wherein shapes and sizes of the plurality of first piezoelectric elements are the same.

15. The piezoelectric actuator according to claim 1, wherein a longitudinal elastic modulus of the plurality of first piezoelectric elements is greater than a transverse elastic modulus of the plurality of first piezoelectric elements, and wherein a longitudinal elastic modulus of the second piezoelectric element is greater than a transverse elastic modulus of the second piezoelectric element.

16. A lens barrel comprising the piezoelectric actuator according to claim 1.

17. The piezoelectric actuator according to claim 1, wherein
the first direction is a direction intersecting a direction in which one of the first piezoelectric elements, the first member, and another of the first piezoelectric elements are arranged in order.

18. A piezoelectric actuator comprising:
a plurality of first piezoelectric elements provided on a base unit;
a second piezoelectric element;
a first member that is arranged between the plurality of first piezoelectric elements and that is driven in a first direction by the plurality of first piezoelectric elements, the first direction intersecting a direction in which the plurality of first piezoelectric elements are arranged, the second piezoelectric element being coupled to the first member;
a second member that is driven in a second direction by the second piezoelectric element, the second direction intersecting the first direction; and
a third member that is moved by the second member, wherein
the second member is provided with an inclined surface that is inclined with respect to a contact surface that comes into contact with the third member such that a cross-sectional area of a cross-section of the second member parallel to the contact surface is smaller as the cross-section approaches the third member.

19. The piezoelectric actuator according to claim 18, wherein
the first direction is a direction intersecting a direction in which one of the first piezoelectric elements, the first member, and another of the first piezoelectric elements are arranged in order.

20. The piezoelectric actuator according to claim 18, wherein
the first member is supported by the base unit via the first piezoelectric elements, and the second member is supported by the base unit via the second piezoelectric element.

21. The piezoelectric actuator according to claim 19, wherein
the inclined surface is provided along a direction intersecting a relative movement direction of the third member.

* * * * *